US011040661B2

(12) United States Patent
Shidochi et al.

(10) Patent No.: US 11,040,661 B2
(45) Date of Patent: Jun. 22, 2021

(54) IMAGE DISPLAY APPARATUS

(71) Applicant: TOYOTA JIDOSHA KABUSHIKI KAISHA, Toyota (JP)

(72) Inventors: Yuka Shidochi, Toyota (JP); Goro Asai, Toyota (JP); Kunihiro Sugihara, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 234 days.

(21) Appl. No.: 16/199,476

(22) Filed: Nov. 26, 2018

(65) Prior Publication Data

US 2019/0176702 A1   Jun. 13, 2019

(30) Foreign Application Priority Data

Dec. 11, 2017   (JP) .............................. JP2017-237036

(51) Int. Cl.
*B60R 1/06* (2006.01)
*G06T 5/50* (2006.01)
*B60R 1/00* (2006.01)

(52) U.S. Cl.
CPC ................. *B60R 1/06* (2013.01); *B60R 1/00* (2013.01); *G06T 5/50* (2013.01); *B60R 2300/105* (2013.01); *B60R 2300/303* (2013.01); *B60R 2300/304* (2013.01); *B60R 2300/605* (2013.01); *B60R 2300/802* (2013.01); *B60R 2300/806* (2013.01); *B60R 2300/8046* (2013.01)

(58) Field of Classification Search
None
See application file for complete search history.

(56) References Cited

U.S. PATENT DOCUMENTS

| 7,161,616 B1* | 1/2007 | Okamoto .............. G06T 3/4038 348/148 |
| 10,346,694 B2* | 7/2019 | Irie .................... G06K 9/00805 |
| 2003/0122930 A1 | 7/2003 | Schofield et al. |
| 2005/0174429 A1* | 8/2005 | Yanai ........................ B60R 1/00 348/148 |
| 2006/0152351 A1* | 7/2006 | Daura Luna ........... B60Q 9/005 340/435 |

(Continued)

FOREIGN PATENT DOCUMENTS

| DE | 19816054 A1 | 10/1998 |
| JP | 2005-112267 A | 4/2005 |

(Continued)

*Primary Examiner* — Ricky Chin
(74) *Attorney, Agent, or Firm* — Sughrue Mion, PLLC

(57) ABSTRACT

An image display apparatus has: a synthesizing device (132) for synthesizing a rear image (111B) and a rear side image (111BL, 111BR) to generate a synthesized image (111C), wherein the rear image is captured by a rear imaging device (11B) for imaging a rear area of a vehicle (1) and the rear side image is captured by a rear side imaging device (11BL, 11BR) for imaging a rear side area of the vehicle; and a displaying device (14) for displaying the synthesized image, the synthesizing device generates the synthesized image so that the synthesized image generated when the vehicle goes in reverse includes a first scene that is below, viewed from the vehicle, a second scene that is included in the synthesized image generated when the vehicle does not go in reverse.

8 Claims, 14 Drawing Sheets

(56) References Cited

U.S. PATENT DOCUMENTS

| | | | |
|---|---|---|---|
| 2007/0057816 A1* | 3/2007 | Sakakibara | B62D 15/0275 340/932.2 |
| 2007/0088478 A1* | 4/2007 | Mori | G01S 11/12 701/41 |
| 2008/0231703 A1 | 9/2008 | Nagata et al. | |
| 2010/0134264 A1* | 6/2010 | Nagamine | B60Q 9/005 340/435 |
| 2010/0201818 A1* | 8/2010 | Imanishi | B60R 1/00 348/148 |
| 2011/0025848 A1* | 2/2011 | Yumiba | B62D 15/029 348/148 |
| 2011/0063444 A1* | 3/2011 | Okamoto | B60R 1/00 348/148 |
| 2012/0062743 A1* | 3/2012 | Lynam | H04N 5/23293 348/148 |
| 2012/0140072 A1* | 6/2012 | Murashita | G06K 9/00805 348/148 |
| 2013/0010119 A1* | 1/2013 | Mitsugi | H04N 7/183 348/148 |
| 2014/0036063 A1* | 2/2014 | Kim | G07C 5/0866 348/118 |
| 2014/0347485 A1* | 11/2014 | Zhang | B60R 1/00 348/148 |
| 2015/0002954 A1* | 1/2015 | Lynam | B60R 1/082 359/866 |
| 2015/0015479 A1* | 1/2015 | Cho | G06F 3/1423 345/156 |
| 2015/0319370 A1* | 11/2015 | Wang | H04N 5/247 348/148 |
| 2015/0364043 A1* | 12/2015 | Lee | G08G 1/168 348/118 |
| 2016/0185292 A1* | 6/2016 | Asai | B60R 1/00 348/148 |
| 2017/0280091 A1* | 9/2017 | Greenwood | H04N 5/23293 |
| 2017/0282797 A1* | 10/2017 | Saito | B60R 1/00 |
| 2017/0334356 A1* | 11/2017 | Fujita | B60R 1/002 |
| 2018/0082589 A1* | 3/2018 | Park | G01C 21/3407 |
| 2018/0154831 A1* | 6/2018 | Spencer | H04N 7/181 |
| 2018/0160030 A1* | 6/2018 | Chaney, Jr. | H04N 7/181 |
| 2019/0111845 A1* | 4/2019 | Karas | B60R 1/00 |
| 2019/0176702 A1* | 6/2019 | Shidochi | B60R 1/00 |
| 2019/0248288 A1* | 8/2019 | Oba | G06T 3/00 |
| 2019/0275942 A1* | 9/2019 | Shimizu | B60R 11/02 |
| 2020/0156543 A1* | 5/2020 | Kubota | B60R 1/006 |

FOREIGN PATENT DOCUMENTS

| | | |
|---|---|---|
| JP | 2006-338566 A | 12/2006 |
| JP | 2008-230558 A | 10/2008 |
| WO | 2011014497 A1 | 2/2011 |
| WO | 2011014903 A1 | 2/2011 |

* cited by examiner

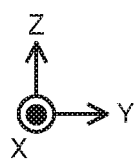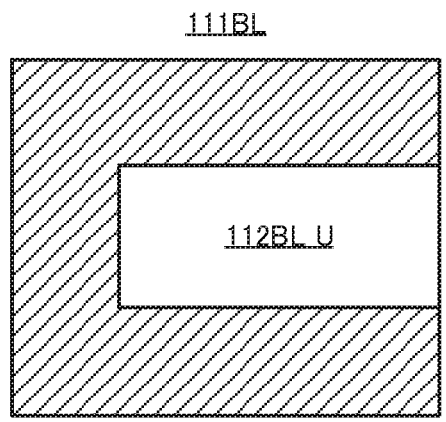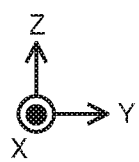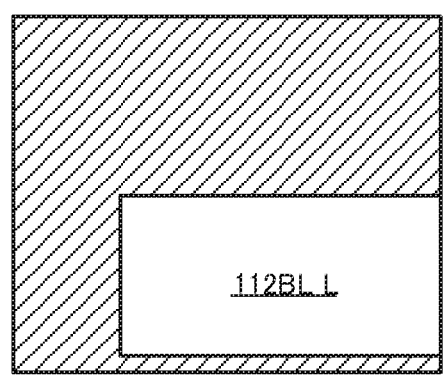
FIG. 6A                                    FIG. 6B

IMAGE DISPLAY APPARATUS

TECHNICAL FIELD

The present invention relates to a technical field of an image display apparatus that is configured to synthesize images that are captured by a plurality of cameras placed at a vehicle and to display the synthesized image, for example.

BACKGROUND ART

Each of a Patent Literature 1 and a Patent Literature 2 discloses one example of an image display apparatus. Specifically, the Patent Literature 1 discloses an image display apparatus that is configured to generate a synthesized image by synthesizing a rear side image (a rear and lateral image) that is captured by a camera configured to image a rear side area (a rear and lateral area) of a target vehicle and a rear image that is captured by a camera configured to image a rear area of the target vehicle seamlessly at the rear of the target vehicle so that the synthesized image is an image obtained by taking a view of the rear surroundings of the target vehicle from a virtual viewpoint and to display the generated synthesized image on a display apparatus of a vehicle interior mirror. The Patent Literature 2 discloses an image display apparatus that is configured to trim (crop) a rear right image that is captured by a camera configured to image a rear right area of a target vehicle and a rear left image that is captured by a camera configured to image a rear left area of the target vehicle on the basis of a distance between the target vehicle and a rear vehicle that travels at the rear of the target vehicle, to generate a synthesized image by synthesizing the trimmed rear left image and the trimmed rear right image and to display the generated synthesized image.

Moreover, a Patent Literature 3 is a background art document that is related to the present invention, although the Patent Literature 3 is not a document that discloses the image display apparatus configured to display the synthesized image. The Patent Literature 3 discloses an image display apparatus that is configured to display a wide angle image that is captured by a camera and in which a horizontal angle of view is wide when a vehicle executes a predetermined operation by which the vehicle in a parked state goes in reverse and to display a narrow angle image that is captured by the camera and in which the horizontal angle of view is narrow when the vehicle does not execute the predetermined operation.

CITATION LIST

Patent Literature

[Patent Literature 1] Japanese Unexamined Patent Application Publication No. 2008-230558
[Patent Literature 2] Japanese Unexamined Patent Application Publication No. 2006-338566
[Patent Literature 3] Japanese Unexamined Patent Application Publication No. 2005-112267

SUMMARY OF INVENTION

Technical Problem

The image display apparatus disclosed in each of the Patent Literatures 1 and 2 displays the synthesized image without considering whether or not the vehicle goes in reverse. Therefore, the image display apparatus disclosed in each of the Patent Literatures 1 and 2 has a technical problem that there is a possibility that the image display apparatus does not display the synthesized image that is useful for an occupant (in other words, a person or a driver) of the vehicle when the vehicle goes in reverse. Furthermore, the image display apparatus disclosed in the Patent Literature 3 has a technical problem that the image display apparatus is not capable of displaying the synthesized image that is useful for the occupant of the vehicle when the vehicle goes in reverse, because the image display apparatus disclosed in the Patent Literature 3 never displays the synthesized image.

The above described technical problem is one example of the technical problem to be solved by the present invention. It is therefore an object of the present invention to provide, for example, an image display apparatus that is configured to generate a synthesized image by synthesizing a plurality of images that are captured by a plurality of imaging devices placed at a vehicle, respectively, and that is configured to generate the synthesized image that is useful for an occupant of the vehicle when the vehicle goes in reverse.

Solution to Problem

A first aspect of an image display apparatus of the present invention is provided with: a synthesizing device that is configured to synthesize a rear image and a rear side image to generate a synthesized image, wherein the rear image is captured by a rear imaging device that is configured to image a rear area located at the rear of a vehicle and the rear side image is captured by a rear side imaging device that is configured to image a rear side area located at the rear and the side of the vehicle; and a displaying device that is configured to display the synthesized image, the synthesizing device being configured to generate the synthesized image so that the synthesized image generated when the vehicle goes in reverse includes a first scene that is below, viewed from the vehicle, a second scene that is included in the synthesized image generated when the vehicle does not go in reverse.

A second aspect of an image display apparatus of the present invention is provided with: a synthesizing device that is configured to synthesize a rear image and a rear side image to generate a synthesized image, wherein the rear image is captured by a rear imaging device that is configured to image a rear area located at the rear of a vehicle and the rear side image is captured by a rear side imaging device that is configured to image a rear side area located at the rear and the side of the vehicle; and a displaying device that is configured to display the synthesized image, the synthesizing device is configured to generate the synthesized image so that a method of generating the synthesized image when the vehicle goes in reverse for the purpose of parking the vehicle into a parking space is different from a method of generating the synthesized image when the vehicle goes in reverse for the purpose of getting the vehicle out of a parking space.

BRIEF DESCRIPTION OF DRAWINGS

FIG. 6A is a planar view that illustrates a positional relationship between a rear left image that will be obtained by the rear left camera when the rear left camera images the virtual upper imaging range and a rear left image that is actually captured by the rear left camera, and FIG. 6B is a planar view that illustrates a positional relationship between a rear left image that will be obtained by the rear left camera when the rear left camera images the virtual lower imaging range and the rear left image that is actually captured by the rear left camera.

DESCRIPTION OF EMBODIMENTS

Hereinafter, with reference to drawings, one embodiment of the image display apparatus of the present invention will be described. In the following description, a vehicle 1 to which one embodiment of the image display apparatus of the present invention is adapted will be described.

(1) Structure of Vehicle 1

Figure 1:
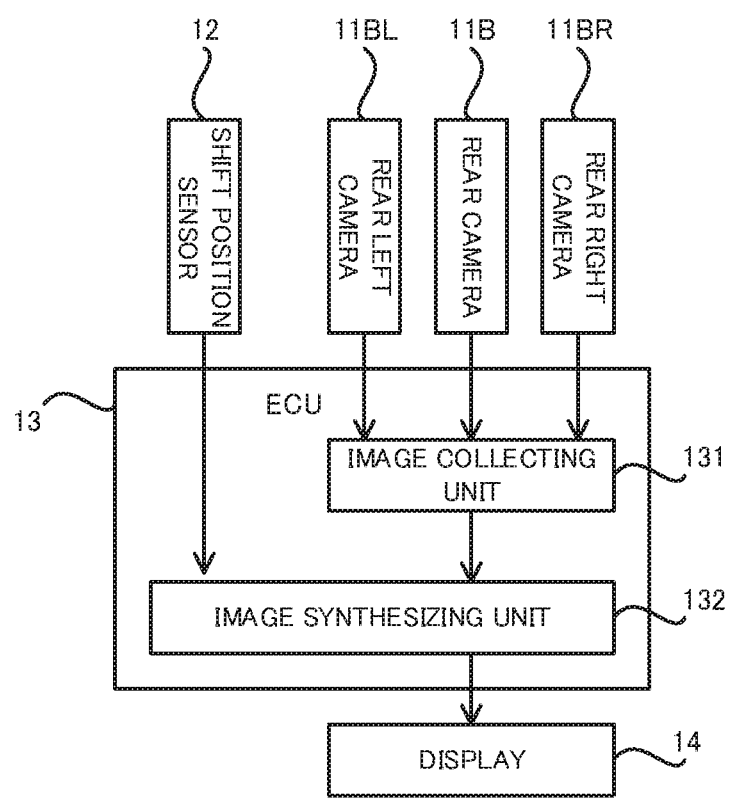
FIG. 1 is a block diagram that illustrates a structure of a vehicle in a present embodiment.
Figure 2A:
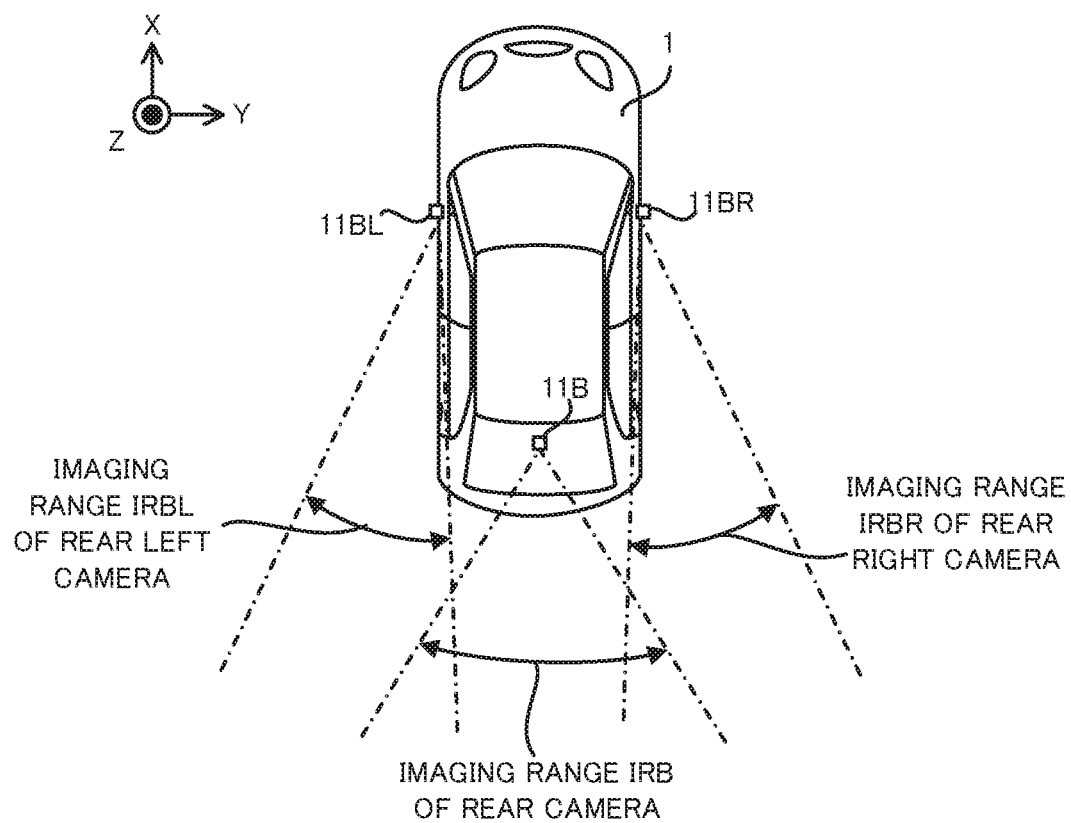
FIG. 2A is a planer view that illustrates positions at which a rear camera, a rear left camera and a rear right camera are placed, respectively, and an imaging range of each of the rear camera, the rear left camera and the rear right camera in the vehicle in the present embodiment.
Figure 2B:
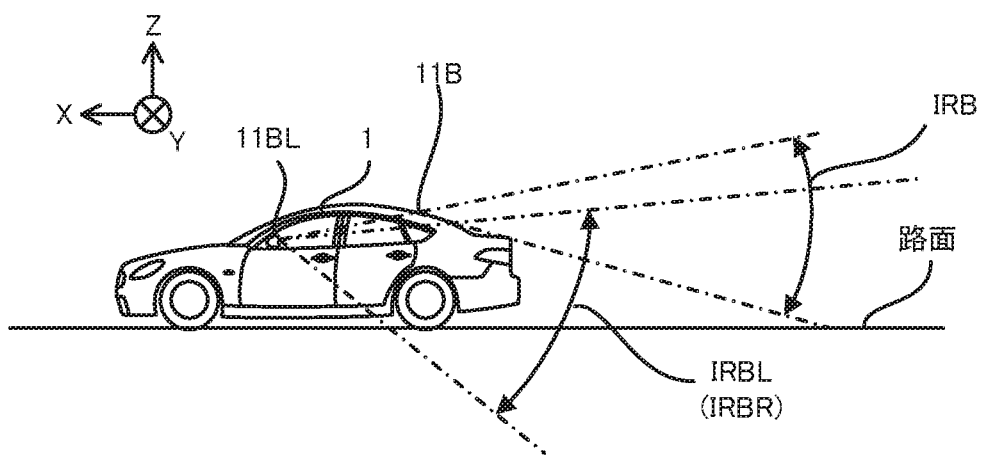
FIG. 2B is a side view that illustrates the positions at which the rear camera, the rear left camera and the rear right camera are placed, respectively, and the imaging range of each of the rear camera, the rear left camera and the rear right camera in the vehicle in the present embodiment.

Firstly, with reference to FIG. 1 and FIG. 2A to FIG. 2B, the structure of the vehicle 1 in the present embodiment will be explained. FIG. 1 is a block diagram that illustrates the structure of the vehicle 1 in a present embodiment. FIG. 2A is a planer view that illustrates positions at which a rear camera 11B, a rear left camera 11BL and a rear right camera 11BR are placed, respectively, and an imaging range of each of the rear camera 11B, the rear left camera 11BL and the rear right camera 11BR in the vehicle 1 in the present embodiment. FIG. 2B is a side view that illustrates the positions at which the rear camera 11B, the rear left camera 11BL and the rear right camera 11BR are placed, respectively, and the imaging range of each of the rear camera 11B, the rear left camera 11BL and the rear right camera 11BR in the vehicle 1 in the present embodiment. Note that the "right", the "left" and the "rear" mean the "right", the "left" and the "rear" based on a traveling direction of the vehicle 1, respectively, in the below described description, if there is no annotation. Moreover, in the below described description, the embodiment will be described by using an XYZ coordinate system in which rightward corresponds to "toward +Y direction", a leftward corresponds to "toward −Y direction", backward (rearward) corresponds to "toward −X direction", frontward corresponds to "toward +X direction", upward corresponds to "toward +Z direction", and downward corresponds to "toward −Z direction".

As illustrated in FIG. 1, the vehicle 1 has: the rear camera 11B that is one example of a "rear imaging device" or a "rear imager" in a below described additional statement; the rear left camera 11BL that is one example of a "rear side imaging device" or a "rear side imager" in the below described additional statement; the rear right camera 11BR that is one example of the "rear side imaging device" or the "rear side imager" in the below described additional statement; a shift position sensor 12; an ECU (Electronic Control Unit) 13 that is one example of the "controller" in the below described additional statement; and a display 14 that is one example of a "displaying device" or a "display" in the below described additional statement.

The rear camera 11B is an imaging device that is configured to image (in other words, capture an image of) a rear area located at the rear (especially, just at the rear) of the vehicle 1 (namely, located at a backward position viewed from the vehicle 1), as illustrated in FIG. 2A and FIG. 2B. The rear area corresponds to an area including at least one portion of an area that is reflected in a back mirror, under the assumption that the back mirror is placed in the vehicle interior (in other words, a cabin) of the vehicle 1. Namely, the rear camera 11B is used as a substitute of the back mirror placed at the vehicle interior of the vehicle 1 and constitutes one portion of what we call an electronic mirror, in the present embodiment. An imaging center of the rear camera 11B is just at the rear of the vehicle 1, in order to image the rear area of the vehicle 1. Namely, an optical axis of an optical system such as a lens of the rear camera 11B extends backwardly and straightforwardly from the vehicle 1. As a result, an imaging range (in other words, an angle of an imaging field) IRB that is imaged by the rear camera 11B is set to include the rear area.

The rear left camera 11BL is an imaging device that is configured to image a rear left area located at the rear of the vehicle 1 (especially, at the rear of the vehicle 1 and at the left of the vehicle 1, namely, at a backward and leftward position viewed from the vehicle 1), as illustrated in FIG. 2A and FIG. 2B. The rear left area corresponds to an area including at least one portion of an area that is reflected in a door mirror placed at a left door when the left door is in the closed state (in other words, the left door is closed), under the assumption that the door mirror is placed at the left door of the vehicle 1 that is placed at the left side of the vehicle 1. Namely, the rear left camera 11BL is used as a substitute of the door mirror placed at the left door of the vehicle 1 and constitutes one portion of what we call an electronic mirror, in the present embodiment. An imaging center of the rear left camera 11BL is at the left of vehicle 1 and at the rear of the vehicle 1, in order to image the rear left area of the vehicle 1. In other words, the imaging center of the rear left camera 11BL is at the left of the imaging center of the rear camera 11B. Namely, an optical axis of an optical system such as a lens of the rear left camera 11BL extends backward at the left of the above described optical axis of the optical system of the rear camera 11B. As a result, an imaging range (in other words, angle of imaging field) IRBL that is imaged by the rear left camera 11BL is set to include the rear left area. Note that the imaging range IRBL may overlaps partially with the imaging range IRB.

The rear right camera 11BR is an imaging device that is configured to image a rear right area located at the rear of the vehicle 1 (especially, at the rear of the vehicle 1 and at the right of the vehicle 1, namely, at a backward and rightward position viewed from the vehicle 1), as illustrated in FIG. 2A and FIG. 2B. The rear right area corresponds to an area including at least one portion of an area that is reflected in a door mirror placed at a right door when the right door is in a closed state (in other words, the right door is closed), under the assumption that the door mirror is placed at the right door of the vehicle 1 that is placed at the right side of the vehicle 1. Namely, the rear right camera 11BR is used as a substitute of the door mirror placed at the right door of the vehicle 1 and constitutes one portion of what we call an electronic mirror, in the present embodiment. An imaging center of the rear right camera 11BR is at the right of vehicle 1 and at the rear of the vehicle 1, in order to image the rear right area of the vehicle 1. In other words, the imaging center of the rear right camera 11BR is at the right of the imaging center of the rear camera 11B. Namely, an optical axis of an optical system such as a lens of the rear right camera 11BR extends backward at the right of the above described optical axis of the optical system of the rear camera 11B. As a result, an imaging range (in other words, an angle of an imaging field) IRBR that is imaged by the rear right camera 11BR is set to include the rear right area. Note that the imaging range IRBR may overlaps partially with the imaging range IRB.

The shift position sensor 12 is a detecting device that is configured to detect a gear range (in other others, a shift position or a shift range) of a gear mechanism (namely, a transmission) of the vehicle 1. Namely, the shift position sensor 12 is a detecting device that is configured to detect what range the current gear range of the gear mechanism is.

The ECU 13 is configured to control entire operation of the vehicle 1. Especially in the present embodiment, the ECU 13 is configured to execute an image display operation for displaying, at the display 14, a rear image 111B, a rear left image 111BL and a rear right image 111BR. The rear image 111B is an image that is captured by the rear camera 11B (namely, an image indicating a circumstance of the rear area). The rear left image 111BL is an image that is captured by the rear left camera 11BL (namely, an image indicating a circumstance of the rear left area). The rear right image 111BR is an image that is captured by the rear right camera 11BR (namely, an image indicating a circumstance of the rear right area). In order to perform the image display operation, the ECU 13 includes, as processing blocks that are logically realized in the ECU 13, an image collecting unit 131 and an image synthesizing unit 132 that is one example of a "synthesizing device" in the below described additional statement.

The image collecting unit 131 is configured to collect the rear image 111B, the rear left image 111BL and the rear right image 111BR from the rear camera 11B, the rear left camera 11BL and the rear right camera 11BR, respectively.

Figure 3:
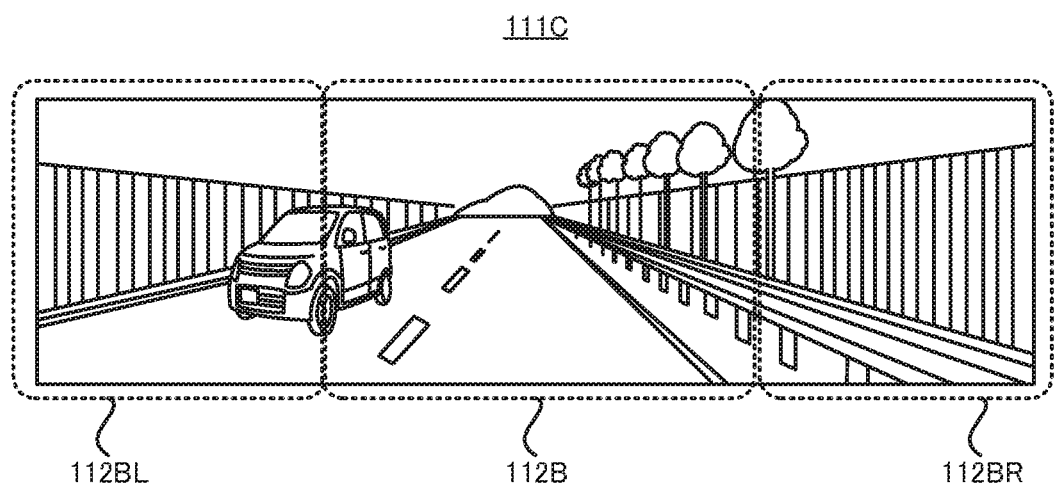
FIG. 3 is a planar view that illustrates a synthesized image generated by an image synthesizing process in the present embodiment.

The image synthesizing unit 132 is configured to generate a synthesized image 111C by executing an image synthesizing process for synthesizing the rear image 111B, the rear left image 111BL and the rear right image 111BR. Specifically, the image synthesizing unit 132 is configured to extract, from the rear image 111B, a rear image 112B corresponding to an image part that is at least one portion of the rear image 111B by trimming (in other words, cropping) the rear image 111B. Moreover, the image synthesizing unit 132 is configured to extract, from the rear left image 111BL, a rear left image 112BL corresponding to an image part that is at least one portion of the rear left image 111BL by trimming the rear left image 111BL. Moreover, the image synthesizing unit 132 is configured to extract, from the rear right image 111BR, a rear right image 112BR corresponding to an image part that is at least one portion of the rear right image 111BR by trimming the rear right image 111BR. Then, the image synthesizing unit 132 is configured to generate the synthesized image 111C in which the rear left area is located on the left of the rear area and the rear right area is located on the right of the rear area. Namely, the image synthesizing unit 132 is configured to generate the synthesized image 111C in which the rear left image 112BL is located on the left of the rear image 112B and the rear right image 112BR is located on the right of the rear image 112B, as illustrated in FIG. 3.

Furthermore, the image synthesizing unit 132 is configured to control the display 14 to display the generated synthesized image 111C. Note that the display 14 is placed in the vehicle interior of the vehicle 1 and is configured to display the synthesized image 111C to an occupant (in other words, a person or a driver) of the vehicle 1 in the vehicle interior.

(2) Specific Examples of Image Display Operation

Next, specific examples of the image display operation executed by the ECU 13 will be described. In the present embodiment, the ECU 13 is allowed to execute at least one of a first specific example of the image display operation and a second specific example of the image display operation. Thus, the first specific example of the image display operation and the second specific example of the image display operation will be described in order in the below described description.

Figure 4:
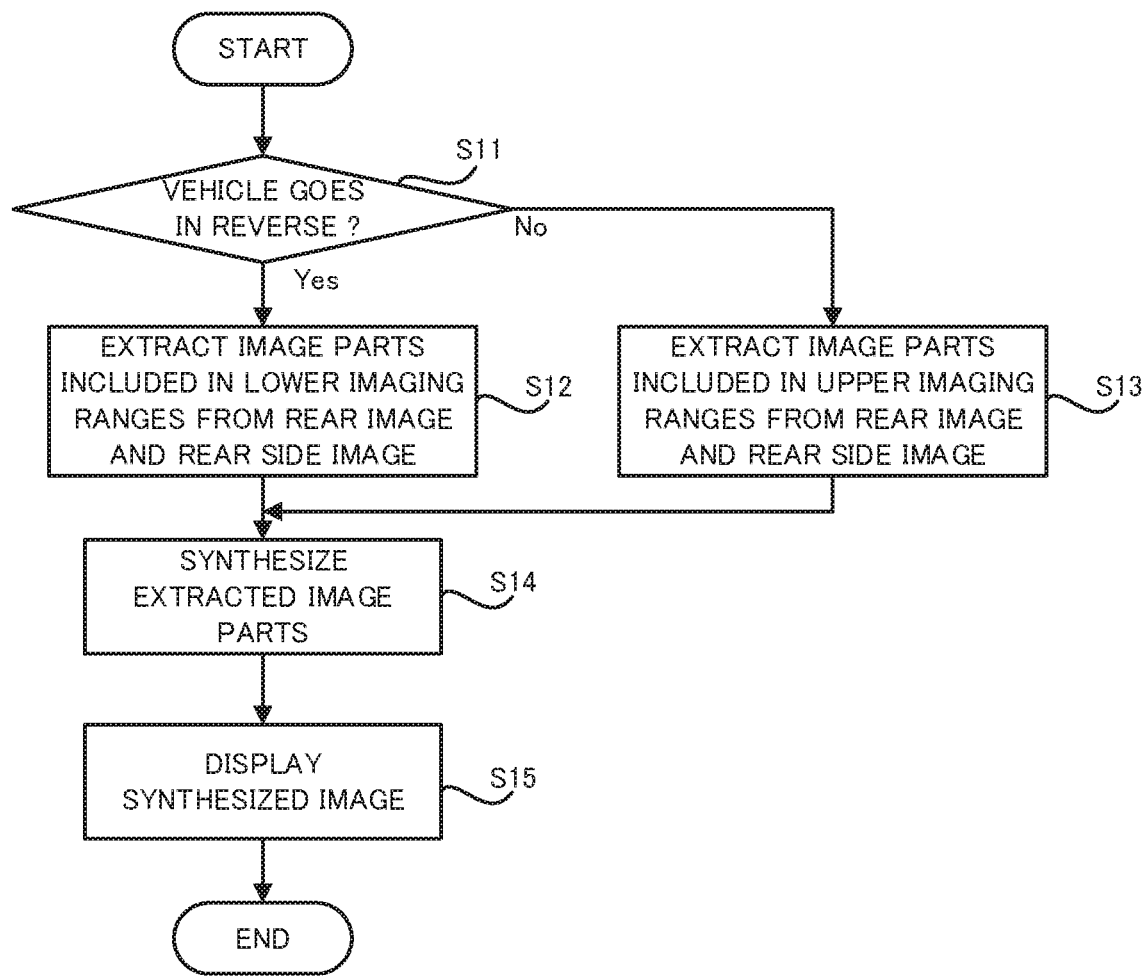
FIG. 4 is a flowchart that illustrates a flow of a first specific example of an image display operation.

(2-1) First Specific Example of Image Display Operation
(2-1-1) Flow of First Specific Example of Image Display Operation Firstly, with reference to FIG. 4, a flow of the first specific example of the image display operation will be described. FIG. 4 is a flowchart that illustrates the flow of the first specific example of the image display operation.

As illustrated in FIG. 4, the image synthesizing unit 132 determines on the basis of a detection result of the shift position sensor 12 whether or not the vehicle 1 goes in reverse (a step S11). Namely, the image synthesizing unit 132 determines whether or not the current gear range of the gear mechanism is a R range (namely, a range that is used when the vehicle 1 goes in reverse).

As a result of the determination at the step S11, if it is determined that the vehicle 1 does not go in reverse (namely, the current gear range is not the R range) (the step S11: No), the image synthesizing unit 132 extracts, as a rear image 112B from the rear image 111B, an image part that will be obtained by the rear camera 11B when the rear camera 11B images a virtual upper imaging range IRB_U that is at least one portion of the imaging range IRB (a step S13). Moreover, the image synthesizing unit 132 extract, as a rear left image 112BL from the rear left image 111BL, an image part that will be obtained by the rear left camera 11BL when the rear left camera 11BL images a virtual upper imaging range IRBL_U that is at least one portion of the imaging range IRBL (the step S13). Moreover, the image synthesizing unit 132 extracts, as a rear right image 112BR from the rear right image 111BR, an image part that will be obtained by the rear right camera 11BR when the rear right camera 11BR images a virtual upper imaging range IRBR_U that is at least one portion of the imaging range IRBR (the step S13).

On the other hand, as a result of the determination at the step S11, if it is determined that the vehicle 1 goes in reverse (namely, the current gear range is the R range) (the step S11: Yes), the image synthesizing unit 132 extracts, as the rear image 112B from the rear image 111B, an image part that will be obtained by the rear camera 11B when the rear camera 11B images a virtual lower imaging range IRB_L that is at least one portion of the imaging range IRB (a step S12). Moreover, the image synthesizing unit 132 extract, as the rear left image 112BL from the rear left image 111BL, an image part that will be obtained by the rear left camera 11BL when the rear left camera 11BL images a virtual lower imaging range IRBL_L that is at least one portion of the imaging range IRBL (the step S12). Moreover, the image synthesizing unit 132 extracts, as the rear right image 112BR from the rear right image 111BR, an image part that will be obtained by the rear right camera 11BR when the rear right camera 11BR images a virtual lower imaging range IRBR_L that is at least one portion of the imaging range IRBR (the step S12)

Here, with reference to FIG. 5A to FIG. 5B and FIG. 6A to FIG. 6B, the upper imaging range IRB_U, the upper imaging range IRBL_U, the upper imaging range IRBR_U, the lower imaging range IRB_L, the lower imaging range IRBL_L and the lower imaging range IRBR_L will be described. Note that the upper imaging range IRB_U, the upper imaging range IRBR_U, the lower imaging range IRB_L and the lower imaging range IRBR_L are omitted in FIG. 5A to FIG. 5B and FIG. 6A to FIG. 6B for the purpose of avoiding the complicated illustration.

Figure 5A:
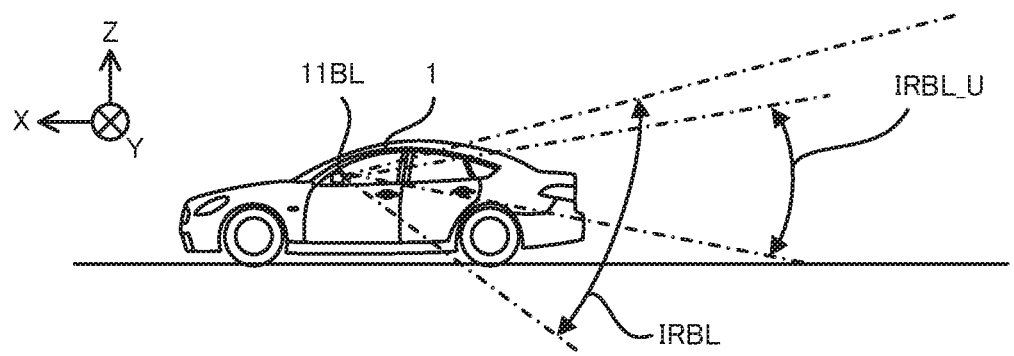
FIG. 5A is a side view that illustrates a left side surface of the vehicle and a positional relationship between an actual imaging range and a virtual upper imaging range of the rear left camera.
Figure 5B:
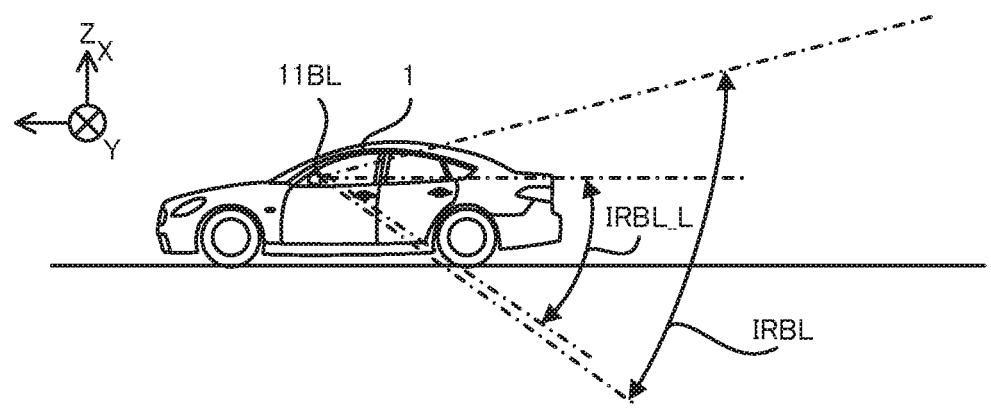
FIG. 5B is a side view that illustrates the left side surface of the vehicle and a positional relationship between the actual imaging range and a virtual lower imaging range of the rear left camera.

FIG. 5A is a side view that illustrates a left side surface of the vehicle 1 and a positional relationship between the imaging range IRBL and the upper imaging range IRBL_U. On the other hand, FIG. 5B is a side view that illustrates the left side surface of the vehicle 1 and a positional relationship between the imaging range IRBL and the lower imaging range IRBL_L. As illustrated in FIG. 5A and FIG. 5B, the upper imaging range IRBL_U includes an imaging range that is at least one portion of the imaging range IRBL and that is upper than the lower imaging range IRBL_L. The lower imaging range IRBL_L includes an imaging range that is at least one portion of the imaging range IRBL and that is lower than the upper imaging range IRBL_U. The imaging synthesizing unit 132 may adjust (namely, change) a position of at least one of the upper imaging range IRBL_U and the lower imaging range IRBL_L in the imaging range IRBL, as necessary.

A relationship that is same as the relationship holding among the imaging range IRBL, the upper imaging range IRBL_U and the lower imaging range IRBL_L also holds among the imaging range IRB, the upper imaging range IRB_U and the lower imaging range IRB_L. A relationship that is same as the relationship holding among the imaging range IRBL, the upper imaging range IRBL_U and the lower imaging range IRBL_L also holds among the imaging range IRBR, the upper imaging range IRBR_U and the lower imaging range IRBR_L.

Moreover, it is preferable that the lower imaging range IRBL_L be an imaging range that includes at least one portion of a rear wheel (especially, a rear left wheel) of the vehicle 1 therein. In this case, it is more preferable that the lower imaging range IRBL_L be an imaging range that includes a road near the rear wheel as well as at least one portion of the rear wheel of the vehicle 1 therein. Moreover, it is preferable that the lower imaging range IRBL_L be an imaging range that includes at least one portion of a body (for example, the left side surface of the body, a left door or the like) of the vehicle 1 therein. In this case, it is more preferable that the lower imaging range IRBL_L be an imaging range that includes a road near the body as well as at least one portion of the body of the vehicle 1 therein.

It is also preferable that the lower imaging range IRBR_L be an imaging range that includes at least one portion of a rear wheel (especially, a rear right wheel) of the vehicle 1 and/or at least one portion of a body (for example, a right side surface of the body, a right door or the like) of the vehicle 1 and the road near the rear wheel and/or the body therein, as with the lower imaging range IRBL_L. On the other hand, the lower imaging range IRB_L may not be an imaging range that includes at least one portion of the rear wheel of the vehicle 1 and/or at least one portion of the body of the vehicle 1 and the road near the rear wheel and/or the body therein, depending on a position thereof. Of course, the lower imaging range IRB_L may be the imaging range that includes at least one portion of the rear wheel of the vehicle 1 and/or at least one portion of the body of the vehicle 1 and the road near the rear wheel and/or the body therein.

FIG. 6A illustrates a relationship between the rear left image 111BL and the rear left image 112BL corresponding to an image part that will be captured by the rear left camera 11BL when the rear left camera 11BL images the upper imaging range IRBL_U. Hereinafter, the rear left image 112BL corresponding to the image part that will be captured by the rear left camera 11BL when the rear left camera 11BL images the upper imaging range IRBL_U is referred to as a "rear left image 112BL_U". On the other hand, FIG. 6B illustrates a relationship between the rear left image 111BL and the rear left image 112BL corresponding to an image part that will be captured by the rear left camera 11BL when the rear left camera 11BL images the lower imaging range IRBL_L. Hereinafter, the rear left image 112B corresponding to the image part that will be captured by the rear left camera 11BL when the rear left camera 11BL images the lower imaging range IRBL_L is referred to as a "rear left image 112BL_L". As illustrated in FIG. 6A and FIG. 6B, the rear left image 112BL_U includes an image part that is upper than the rear left image 112BL_L. In other words, the rear left image 112BL_L includes an image part that is lower than the rear left image 112BL_U. Namely, in the first specific example, the image synthesizing unit 132 is allowed to adjust or change a position (especially, a position along a vertical direction) of the rear left image 112BL, which is extracted from the rear left image 111BL, in the rear left image 111BL on the basis of a result of a determination whether or not the vehicle 1 goes in reverse. In other words, the image synthesizing unit 132 is allowed to adjust or change a position of the trimmed image part, which is trimmed from the rear left image 111BL, in the rear left image 111BL on the basis of the result of the determination whether or not the vehicle 1 goes in reverse.

A relationship that is same as the relationship holding between the rear left image 112BL_U and the rear left image 112BL_L also holds between the rear image 112B corresponding to the image part that will be captured by the rear camera 11B when the rear camera 11B images the upper imaging range IRB_U and the rear image 112B corresponding to the image part that will be captured by the rear camera 11B when the rear camera 11B images the lower imaging range IRB_L. A relationship that is same as the relationship holding between the rear left image 112BL_U and the rear left image 112BL_L also holds between the rear right image 112BR corresponding to the image part that will be captured by the rear right camera 11BR when the rear right camera 11BR images the upper imaging range IRBR_U and the rear right image 112BR corresponding to the image part that will be captured by the rear right camera 11BR when the rear right camera 11BR images the lower imaging range IRBR_L.

Again in FIG. 4, then, the image synthesizing unit 132 generates the synthesized image 111C in which the rear left image 112BL is located on the left of the rear image 112B and the rear right image 112BR is located on the right of the rear image 112B by using the rear image 112B, the rear left image 112BL and the rear right image 112BR extracted at the step S12 or the step S13 (a step S14). Note that the image synthesizing unit 132 may execute, as one portion of the image synthesizing process, at least one of an observing point converting process, an image rotating process, a scaling process and an image shape forming process so that the rear image 112B, the rear left image 112BL and the rear right image 112BR are seamlessly connected in the synthesizing image 111C when the image synthesizing unit 132 generates the synthesized image 111C. The observing point converting process is a process for converting an observing point (in other words, a viewpoint) of at least one of the rear image 111B, the rear image 112B, the rear left image 111BL, the rear left image 112BL, the rear right image 111BR and the rear right image 112BR. The image rotating process is a process for rotating at least one of the rear image 111B, the rear image 112B, the rear left image 111BL, the rear left image 112BL, the rear right image 111BR and the rear right image 112BR. The scaling process is a process for scaling (in other words, expanding and/or minifying) at least one of the rear image 111B, the rear image 112B, the rear left image 111BL, the rear left image 112BL, the rear right image 111BR and the rear right image 112BR. The image shape forming process is a process for converting (changing) a shape of at least one of the rear image 111B, the rear image 112B, the rear left image 111BL, the rear left image 112BL, the rear right image 111BR and the rear right image 112BR.

Here, with reference to FIG. 7A and FIG. 7B, the synthesized image 111C generated at the step S14 will be described in detail.

Figure 7A:
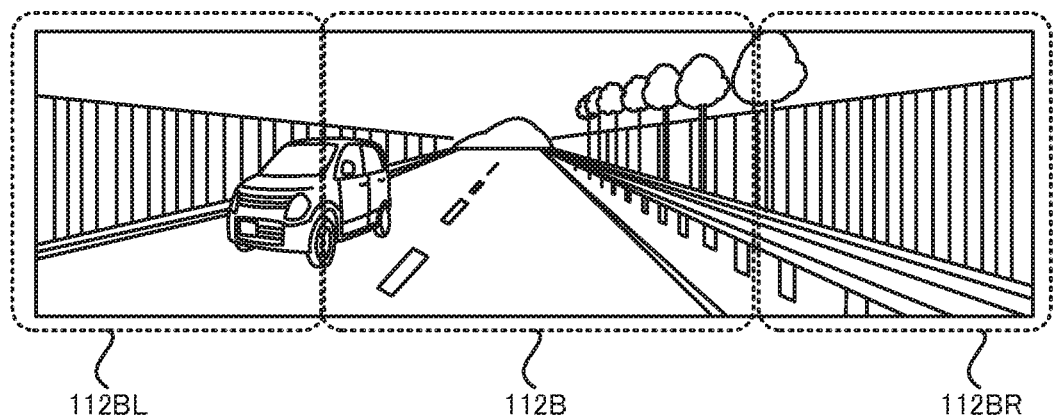
FIG. 7A is a planar view that illustrates the synthesized image generated when the vehicle does not go in reverse.

FIG. 7A is a planar view that illustrates the synthesized image 111C generated when the vehicle 1 does not go in reverse. When the vehicle 1 does not go in reverse, the upper imaging range IRB_U including the upper imaging range that is upper than the lower imaging range IRB_L is used to extract the rear image 112B, the upper imaging range IRBL_U including the upper imaging range that is upper than the lower imaging range IRBL_L is used to extract the rear left image 112BL and the upper imaging range IRBR_U including the upper imaging range that is upper than the lower imaging range IRBR_L is used to extract the rear right image 112BR. Thus, as illustrated in FIG. 7A, the synthesized image 111C is an image in which a relatively far scene is included. Namely, the synthesized image 111C includes a relatively upper scene in a scene spreading at the rear of the vehicle.

Figure 7B:
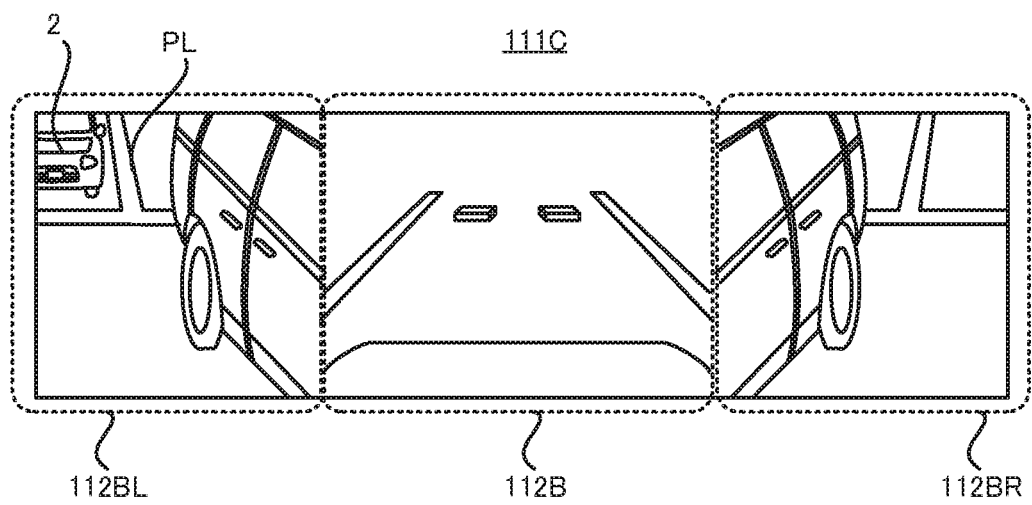
FIG. 7B is a planar view that illustrates the synthesized image generated when the vehicle goes in reverse.

On the other hand, FIG. 7B is a planar view that illustrates the synthesized image 111C generated when the vehicle 1 goes in reverse. When the vehicle 1 does not go in reverse, the lower imaging range IRB_L including the lower imaging range that is lower than the upper imaging range IRB_U is used to extract the rear image 112B, the lower imaging range IRBL_L including the lower imaging range that is lower than the upper imaging range IRBL_U is used to extract the rear left image 112BL and the lower imaging range IRBR_L including the lower imaging range that is lower than the upper imaging range IRBR_U is used to extract the rear right image 112BR. Thus, as illustrated in FIG. 7B, the synthesized image 111C includes a relatively lower scene in the scene spreading at the rear of the vehicle. Thus, there is a relatively high possibility that the synthesized image 111C includes the road near the vehicle 1. As a result, there is a relatively high possibility that the synthesized image 111C includes a target (for example, a parking white line PL drawn on the road, another vehicle 2 parked around a parking space into which the vehicle 1 is parked and the like, as illustrated in FIG. 7B) to which the occupant should pay attention when the vehicle 1 goes in reverse.

When at least one portion of the rear wheel and/or at least one portion of the body is included in the lower imaging range IRBL_L, at least one portion of the rear wheel and/or at least one portion of the body is also included in the rear left image 112BL extracted when the vehicle 1 goes in reverse, as illustrated in FIG. 7B. Same applies to the rear image 112B and the rear right image 112BR. Therefore, at least one portion of the rear wheel and/or at least one portion of the body is also included in the synthesized image 111C generated in this case.

On the other hand, when at least one portion of the rear wheel and/or at least one portion of the body is included in at least one of the rear image 112B, the rear left image 112BL and the rear right image 112BR, it is difficult to generate the synthesized image 111C in which the rear image 112B, the rear left image 112BL and the rear right image 112BR are seamlessly connected. Thus, if it is difficult to generate the synthesized image 111C in which the rear image 112B, the rear left image 112BL and the rear right image 112BR are seamlessly connected, the image synthesizing unit 132 may generate the synthesized image 111C in which the rear image 112B, the rear left image 112BL and the rear right image 112BR are displayed separately (namely, are not connected seamlessly), as illustrated in FIG.

7B. The image synthesizing unit 132 may generate the synthesized image 111C in which the rear image 112B, the rear left image 112BL and the rear right image 112BR are simply arranged.

Considering the difference between the synthesized image 111C that is generated when the vehicle 1 goes in reverse and that is illustrated in FIG. 7B and the synthesized image 111C that is generated when the vehicle 1 does not go in reverse and that is illustrated in FIG. 7A, the process of extracting the image part corresponding to the lower imaging range when the vehicle 1 goes in reverse (namely, the process at the step S12 in FIG. 4) is substantially equivalent to a process of generating the synthesized image 111C so that the synthesized image 111C generated when the vehicle 1 goes in reverse includes a first scene that is below, viewed from the vehicle 1, a second scene that is included in the synthesized image 111C generated when the vehicle 1 does not go in reverse (namely, includes the first scene that is lower than the second scene).

Again in FIG. 4, then, the display 14 displays the synthesized image 111C generated at the step S14 (a step S15).

As described above, according to the first specific example of the image display operation, when the vehicle 1 goes in reverse, the synthesizing image 111C including the relatively lower scene (for example, a scene including the road near the vehicle 1) is displayed. Thus, the occupant of the vehicle 1 can see from the synthesized image 111C whether or not there is any accident that prevents the vehicle 1 from going in reverse, more appropriately than the case where the synthesized image 111C including a relatively upper scene (for example, a scene that is far away from the vehicle 1) is displayed when the vehicle 1 goes in reverse. Specifically, the occupant can see appropriately from the synthesized image 111C whether or not there is any obstacle (for example, at least one of another vehicle, a pedestrian, a construction on the road and any other object) that prevents the vehicle 1 from going in reverse around the vehicle 1, for example. In other words, the occupant can see appropriately the target (for example, the parking white line PL drawn on the road, another vehicle 2 parked on the road and the like, as illustrated in the above described FIG. 7B) to which the occupant should pay attention when the vehicle 1 goes in reverse. Moreover, the occupant can see a condition (for example, a position) of the vehicle 1 appropriately from the synthesized image 111C when the vehicle 1 goes in reverse. Thus, the occupant can drive the vehicle 1 in reverse appropriately while seeing surrounding circumstance of the vehicle 1 more appropriately. Namely, the image synthesizing unit 132 is capable of generating the synthesized image 111C that is useful for the occupant (for example, the synthesized image 111C that is useful to drive the vehicle 1 in reverse relatively easily) when the vehicle 1 goes in reverse.

Moreover, when at least one portion of the rear wheel of the vehicle 1 and/or at least one portion of the body of the vehicle 1 is included in the synthesized image 111C, the occupant can understand a positional relationship between the vehicle 1 and an object that is included in the synthesized image 111C and that is different from the vehicle 1 relatively easily. Specifically, the occupant can understand, relatively easily, a positional relationship between the vehicle 1 and the target to which the occupant should pay attention when the vehicle 1 goes in reverse. Moreover, when the road as well as at least one portion of the rear wheel of the vehicle 1 and/or at least one portion of the body of the vehicle 1 is included in the synthesized image 111C, the occupant can understand where the vehicle 1 is located on the road relatively easily. Thus, when at least one portion of the rear wheel of the vehicle 1 and/or at least one portion of the body of the vehicle 1 (furthermore, the road) is included in the synthesized image 111C, the occupant can see the condition (for example, the position) of the vehicle 1 more appropriately when the vehicle 1 goes in reverse. However, the technical effect that the occupant can understand where the vehicle 1 is located on the road relatively easily can be achieved when at least one portion of the vehicle 1 that is different from the rear wheel and the body is included in the synthesized image 111C. Thus, the image synthesizing unit 132 may generate the synthesized image 111C including at least one portion of the vehicle 1 that is different from the rear wheel and the body.

(2-1-2) Modified Example of First Specific Example of Image Display Operation

In the above described description, the image synthesizing unit 132 extracts the rear image 112B corresponding to the lower imaging range IRB_L, the rear left image 112BL corresponding to the lower imaging range IRBL_L and the rear right image 112BR corresponding to the lower imaging range IRBR_L when the vehicle 1 goes in reverse. However, the image synthesizing unit 132 may extracts the rear image 112B, the rear left image 112BL and the rear right image 112BR at least one of which corresponds to the lower imaging range and at least another one of which corresponds to the upper imaging range when the vehicle 1 goes in reverse. Namely, even when the vehicle 1 goes in reverse, at least one of the rear image 112B, the rear left image 112BL and the rear right image 112BR included in the synthesized image 111C may be the image part corresponding to the upper imaging range as long as at least another one of the rear image 112B, the rear left image 112BL and the rear right image 112BR included in the synthesized image 111C is the image part corresponding to the lower imaging range. Namely, all of the rear image 112B, the rear left image 112BL and the rear right image 112BR included in the synthesized image 111C may not necessarily include the relatively lower scene. Even in this case, the above described technical effect can be achieved to some extent.

In the above described description, the image synthesizing unit 132 adjusts the position of the rear left image 112BL extracted from the rear left image 111BL (in other words, the position of the trimmed image part trimmed from the rear left image 111BL) on the basis of the result of the determination whether or not the vehicle 1 goes in reverse, in order to generate the synthesized image 111C that includes the relatively lower scene when the vehicle 1 goes in reverse. Namely, the image synthesizing unit 132 generates the synthesized image 111C that includes the relatively lower scene by executing an image process (an image processing) on the rear left image 111BL (furthermore, the rear image 111B and the rear right image 111BR). However, the image synthesizing unit 132 may generate the synthesized image 111C that includes the relatively lower scene by using another method. Hereinafter, one example of the method of generating the synthesized image 111C that includes the relatively lower scene will be described.

Figure 8:
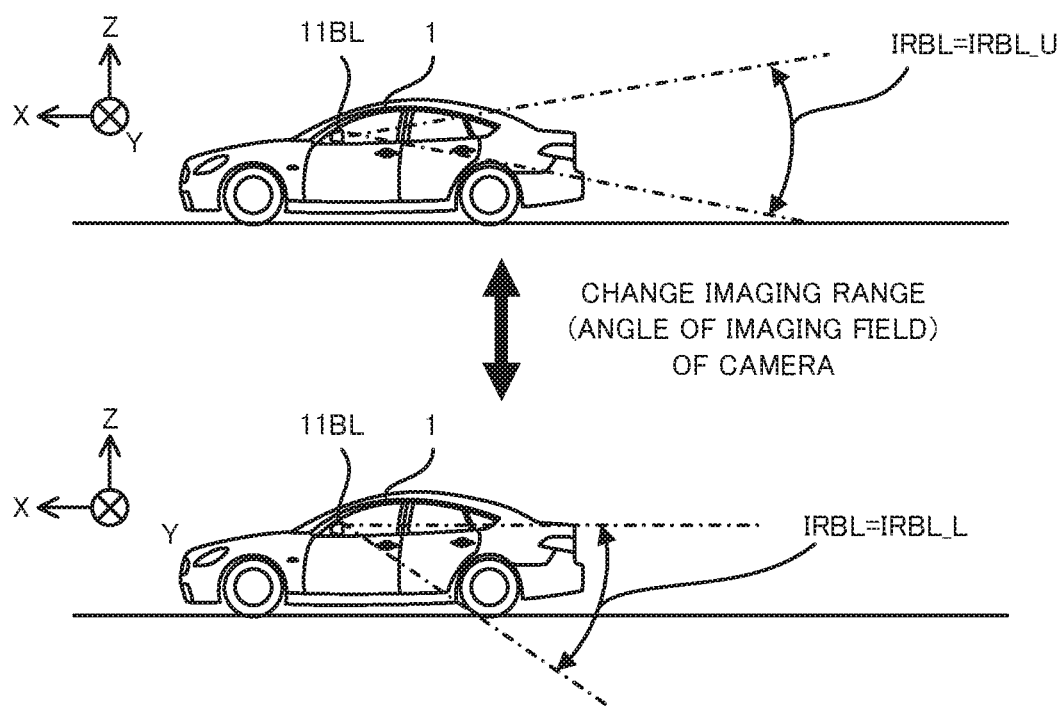
FIG. 8 is a planar view that illustrates the adjusted imaging range of the rear left camera when the vehicle does not go in reverse and the adjusted imaging range of the rear left camera when the vehicle goes in reverse.

The image synthesizing unit 132 may generate the synthesized image 111C that includes the relatively lower scene by controlling the rear left camera 11BL. For example, the image synthesizing unit 132 may generate the synthesized image 111C that includes the relatively lower scene by controlling an optical parameter of the rear left camera 11BL so that the imaging range IRBL is changed. A focal length of an optical system (for example, a lens or the like) of the rear left camera 11BL is one example of the optical parameter. In this case, the image synthesizing unit 132 may control the rear left camera 11BL so that the imaging range IRBL of the rear left camera 11BL is same as the above described upper imaging range IRBL_U as illustrated in an upper diagram of FIG. 8, when the vehicle 1 does not go in reverse. On the other hand, the image synthesizing unit 132 may control the rear left camera 11BL so that the imaging range IRBL of the rear left camera 11BL is same as the above described lower imaging range IRBL_L as illustrated in a lower diagram of FIG. 8, when the vehicle 1 goes in reverse. In this case, the image synthesizing unit 132 may not adjust the position of the rear left image 112BL extracted from the rear left image 111BL (in other words, the position of the trimmed image part trimmed from the rear left image 111BL) on the basis of the result of the determination whether or not the vehicle 1 goes in reverse. Moreover, the image synthesizing unit 132 may generate the synthesized image 111C that includes the relatively lower scene by controlling at least one of the rear camera 11B and the rear right camera 11BR in addition to or instead of the rear left camera 11BL, when the vehicle 1 goes in reverse, although its detailed description is omitted.

Figure 9:
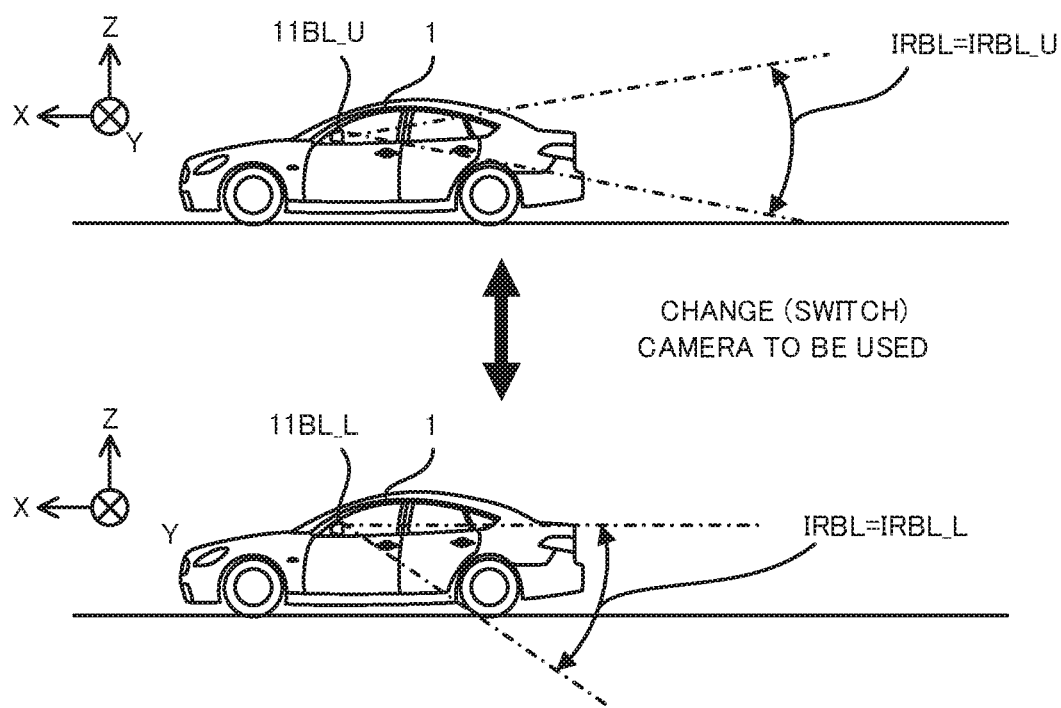
FIG. 9 is a planar view that illustrates the imaging range of one rear left camera selected when the vehicle does not go in reverse and the imaging range of another one rear left camera selected when the vehicle goes in reverse.

Alternatively, when the vehicle 1 is provided with a plurality of rear left cameras 11BL which have different imaging ranges IRBL, respectively, the image synthesizing unit 132 may generate the synthesized image 111C that includes the relatively lower scene by selecting, from the plurality of rear left cameras 11BL, one rear left camera 11BL that should actually capture the rear left image 111BL on the basis of the result of the determination whether or not the vehicle 1 goes in reverse. Specifically, the vehicle 1 may be provided with a rear left camera 11BL_U and a rear left camera 11BL_L. The imaging range IRBL of the rear left camera 11BL_U is same as the above described upper imaging range IRBL_U. The imaging range IRBL of the rear left camera 11BL_L is same as the above described lower imaging range IRBL_L. In this case, the image synthesizing unit 132 may control the rear left camera 11BL_U to capture the rear left image 111BL when the vehicle 1 does not go in reverse, as illustrated in an upper diagram of FIG. 9. On the other hand, the image synthesizing unit 132 may control the rear left camera 11BL_L to capture the rear left image 111BL when the vehicle 1 goes in reverse, as illustrated in a lower diagram of FIG. 9. In this case, the image synthesizing unit 132 may not adjust the position of the rear left image 112BL extracted from the rear left image 111BL (in other words, the position of the trimmed image part trimmed from the rear left image 111BL) on the basis of the result of the determination whether or not the vehicle 1 goes in reverse. Moreover, when the vehicle 1 is provided with a plurality of rear cameras 11B which have different imaging ranges IRB, respectively, the image synthesizing unit 132 may generate the synthesized image 111C that includes the relatively lower scene by selecting, from the plurality of rear cameras 11B, one rear camera 11B that should actually capture the rear image 111B on the basis of the result of the determination whether or not the vehicle 1 goes in reverse, although its detailed description is omitted. When the vehicle 1 is provided with a plurality of rear right cameras 11BR which have different imaging ranges IRBR, respectively, the image synthesizing unit 132 may generate the synthesized image 111C that includes the relatively lower scene by selecting, from the plurality of rear right cameras 11BR, one rear right camera 11BR that should actually capture the rear right image 111BR on the basis of the result of the determination whether or not the vehicle 1 goes in reverse, although its detailed description is omitted.

Figure 10:
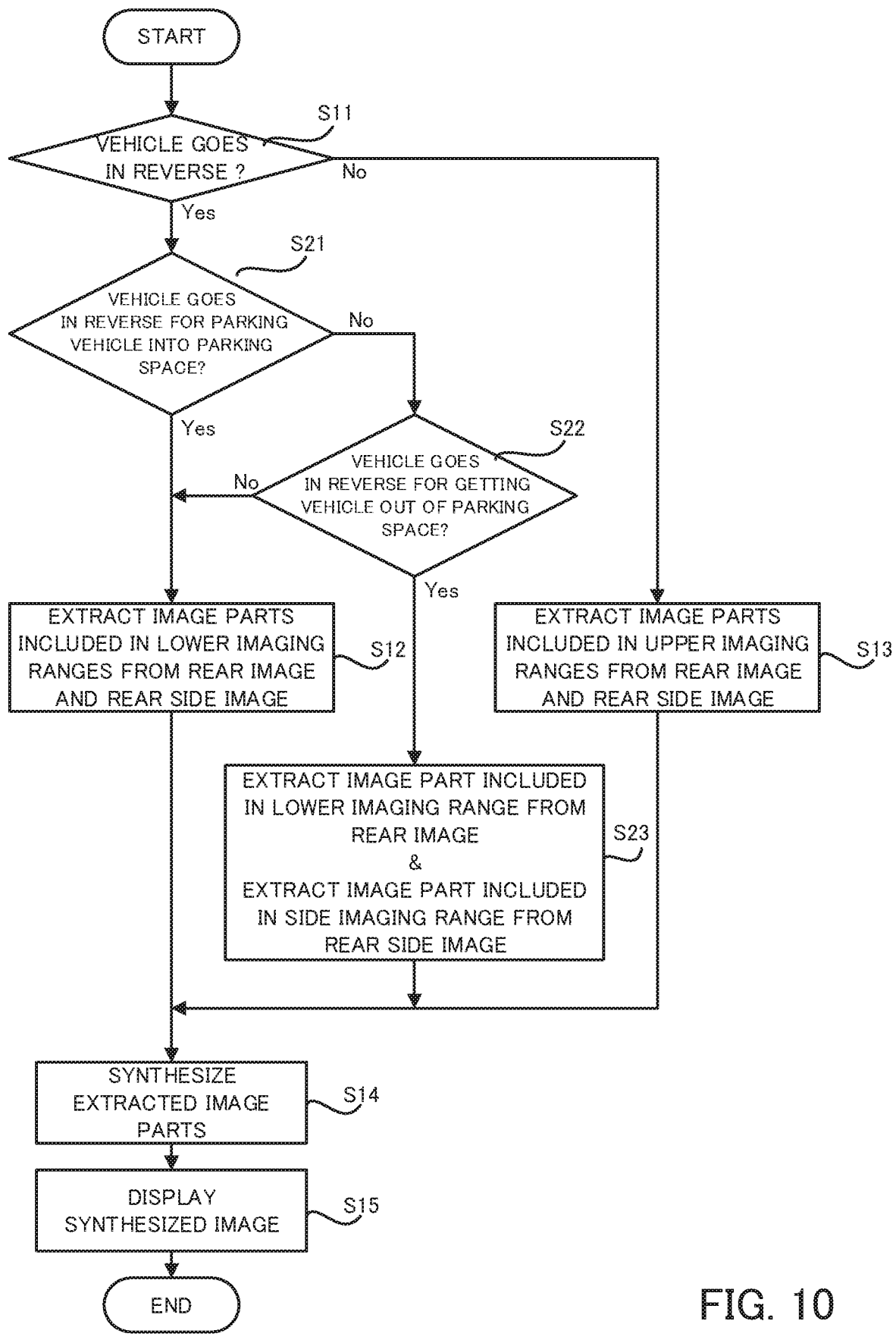
FIG. 10 is a flowchart that illustrates a flow of a second specific example of an image display operation.

(2-2) Second Specific Example of Image Display Operation (2-2-1) Flow of Second Specific Example of Image Display Operation Next, with reference to FIG. 10, a flow of the second specific example of the image display operation will be described. FIG. 10 is a flowchart that illustrates the flow of the second specific example of the image display operation. Note that the detailed description of a process that is same as the process executed in the first specific example of the image display operation is omitted by assigning the same step number to this process.

As illustrated in FIG. 10, the process at the step S11 is also executed in the second specific example, as with the first specific example. As a result of the determination at the step S11, if it is determined that the vehicle 1 does not go in reverse (namely, the current gear range is not the R range) (the step S11: No), the process at the step S13 is also executed in the second specific example, as with the first specific example.

On the other hand, as a result of the determination at the step S11, if it is determined that the vehicle 1 goes in reverse (the step S11: Yes), the image synthesizing unit 132 identifies a purpose of the vehicle 1 going in reverse (namely, a purpose of the backward movement of the vehicle 1) (a step S21 and a step S22). Specifically, the image synthesizing unit 132 determines whether or not the vehicle 1 goes in reverse for the purpose of parking the vehicle 1 into a parking space (the step S21). The image synthesizing unit 132 is capable of identifying the purpose of the vehicle 1 going in reverse on the basis of the detection result of the shift position sensor 12, for example. For example, if the gear range of the gear mechanism is changed from a D range (namely, a range that is used when the vehicle 1 goes forward) to the R range (namely, a range that is used when the vehicle 1 goes in reverse), the image synthesizing unit 132 may determine that the vehicle 1 goes in reverse for the purpose of parking the vehicle 1 into the parking space.

As a result of the determination at the step S21, if it is determined that the vehicle 1 goes in reverse for the purpose of parking the vehicle 1 into the parking space (the step S21: Yes), the process at the step S12 that is also executed in the first specific example is executed.

On the other hand, as a result of the determination at the step S21, if it is determined that the vehicle 1 does not go in reverse for the purpose of parking the vehicle 1 into the parking space (the step S21: No), the image synthesizing unit 132 determines whether or not the vehicle 1 goes in reverse for the purpose of getting (pulling) the vehicle 1 out of the parking space (the step S22). For example, if the gear range of the gear mechanism is changed from a P range (namely, a range that is used when the parked vehicle 1 stops at the parking space) to the R range, the image synthesizing unit 132 may determine that the vehicle 1 goes in reverse for the purpose of getting the vehicle 1 out of the parking space.

As a result of the determination at the step S22, if it is determined that the vehicle 1 goes in reverse for the purpose of getting the vehicle 1 out of the parking space (the step S22: Yes), the image synthesizing unit 132 extracts, as the rear left image 112BL from the rear left image 111BL, an image part that will be obtained by the rear left camera 11BL when the rear left camera 11BL images a virtual side imaging range (in other words, a virtual lateral imaging range) IRBL_S that is at least one portion of the imaging range IRBL (a step S23). Moreover, the image synthesizing unit 132 extracts, as the rear right image 112BR from the rear right image 111BR, an image part that will be obtained by the rear right camera 11BR when the rear right camera 11BR images a virtual side imaging range (in other words, a virtual lateral imaging range) IRBR_S that is at least one portion of the imaging range IRBR (the step S23). On the other hand, the image synthesizing unit 132 extracts, as the rear image 112B from the rear image 111B, the image part that will be obtained by the rear camera 11B when the rear camera 11B images the above described lower imaging range IRB_L (the step S23)

Figure 11A:
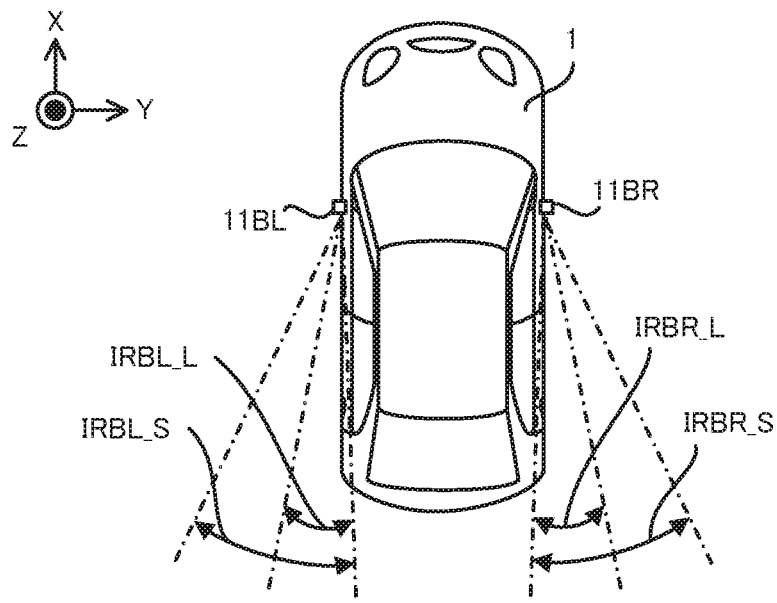
FIG. 11A is a planar view that illustrates the upper imaging ranges and side imaging ranges.

Here, with reference to FIG. 11A and FIG. 11B, the side imaging range IRBL_S and the side imaging range IRBR_S will be described. FIG. 11A is a planar view that illustrates the side imaging range IRBL_S, the side imaging range IRBR_S, the lower imaging range IRBL_L and the lower imaging range IRBR_L. As illustrated in FIG. 11A, the side imaging range IRBL_S includes an imaging range that is at least one portion of the imaging range IRBL and that is located at the left of the lower imaging range IRBL_L. It is preferable that the side imaging range IRBL_S be an imaging range that is obtained by expanding the lower imaging range IRBL_L leftward in the lower imaging range IRBL. Similarly, the side imaging range IRBR_S includes an imaging range that is at least one portion of the imaging range IRBR and that is located at the right of the lower imaging range IRBR_L. It is preferable that the side imaging range IRBR_S be an imaging range that is obtained by expanding the lower imaging range IRBR_L rightward in the lower imaging range IRBR. Moreover, the imaging synthesizing unit 132 may adjust (namely, change) at least one of a position of the side imaging range IRBL_S in the imaging range IRBL and a position of the side imaging range IRBR_S in the imaging range IRBR, as necessary. Note that the side imaging range IRBL_S includes an imaging range that is at least one portion of the imaging range IRBL and that is lower than the upper imaging range IRBL_U, as with the lower imaging range IRBL_L, although its detailed description is omitted. The side imaging range IRBR_S includes an imaging range that is at least one portion of the imaging range IRBR and that is lower than the upper imaging range IRBR_U, as with the lower imaging range IRBR_L, although its detailed description is omitted.

Figures 11B, 11C:
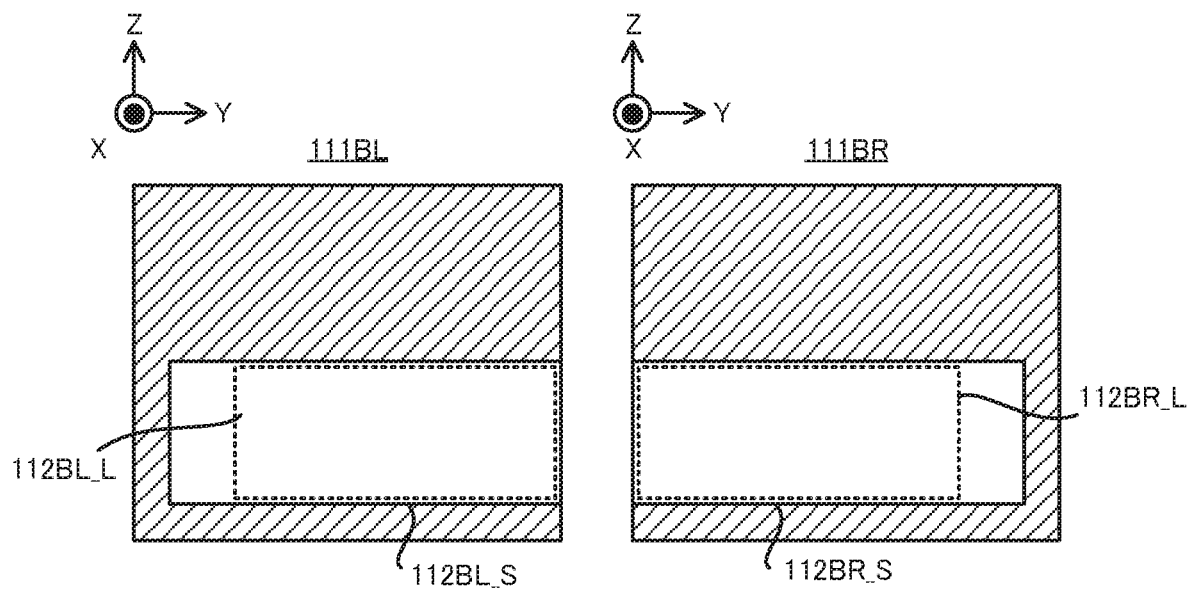
FIG. 11B is a planar view that illustrates a positional relationship between a rear left image obtained by the rear left camera when the rear left camera images the virtual side imaging range and the rear left image actually captured by the rear left camera.
FIG. 11C is a planar view that illustrates a positional relationship between a rear right image obtained by the rear right camera when the rear right camera images the virtual side imaging range and the rear right image actually captured by the rear right camera.

FIG. 11B illustrates a relationship among the rear left image 111BL, the rear left image 112BL_L and the rear left image 112BL corresponding to an image part that will be captured by the rear left camera 11BL when the rear left camera 11BL images the side imaging range IRBL_S. Hereinafter, the rear left image 112BL corresponding to the image part that will be captured by the rear left camera 11BL when the rear left camera 11BL images the side imaging range IRBL_S is referred to as a "rear left image 112BL_S". As illustrated in FIG. 11B, the rear left image 112BL_S includes an image part that is at the left of the rear left image 112BL_L. Namely, in the second specific example, the image synthesizing unit 132 is allowed to adjust or change a position (especially, a position along a horizontal direction) of the rear left image 112BL, which is extracted from the rear left image 111BL, in the rear left image 111BL on the basis of the purpose of the vehicle 1 going in reverse. In other words, the image synthesizing unit 132 is allowed to adjust or change a position of the trimmed image part, which is trimmed from the rear left image 111BL, in the rear left image 111BL on the basis of the purpose of the vehicle 1 going in reverse.

Similarly, FIG. 11C illustrates a relationship among the rear right image 111BR, the rear right image 112BR_L and the rear right image 112BR corresponding to an image part that will be captured by the rear right camera 11BR when the rear right camera 11BR images the side imaging range IRBR_S. Hereinafter, the rear right image 112BR corresponding to the image part that will be captured by the rear right camera 11BR when the rear right camera 11BR images the side imaging range IRBR_S is referred to as a "rear right image 112BR_S". As illustrated in FIG. 11C, the rear right image 112BR_S includes an image part that is at the right of the rear right image 112BR_L. Namely, in the second specific example, the image synthesizing unit 132 is allowed to adjust or change a position (especially, a position along a horizontal direction) of the rear right image 112BR, which is extracted from the rear right image 111BR, in the rear right image 111BR on the basis of the purpose of the vehicle 1 going in reverse. In other words, the image synthesizing unit 132 is allowed to adjust or change a position of the trimmed image part, which is trimmed from the rear right image 111BR, in the rear right image 111BR on the basis of the purpose of the vehicle 1 going in reverse.

Again in FIG. 10, then, the image synthesizing unit 132 generates the synthesized image 111C by using the rear image 112B, the rear left image 112BL and the rear right image 112BR extracted at the step S12, the step S13 or the step S23 (the step S14). Then, the display 14 displays the synthesized image 111C generated at the step S14 (the step S15).

Figure 12A:
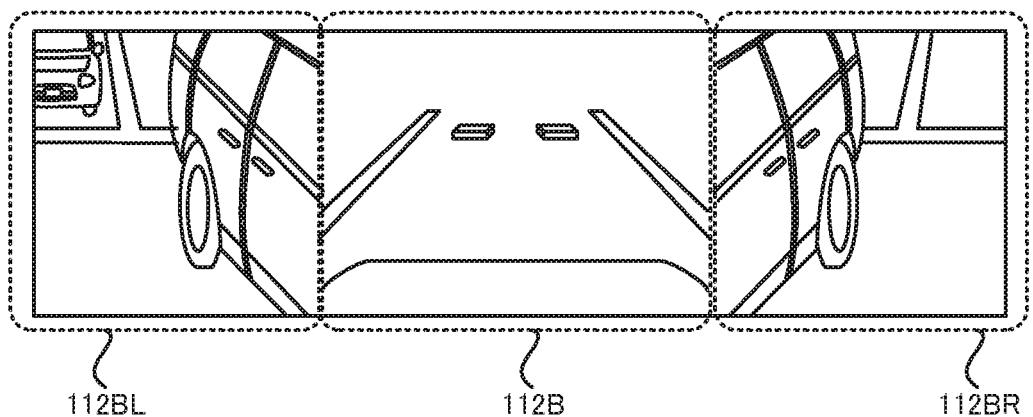
FIG. 12A is a planar view that illustrates the synthesized image generated when the vehicle goes in reverse for the purpose of parking the vehicle into a parking space.

Here, with reference to FIG. 12A and FIG. 12B, the synthesized image 111C generated at the step S14 will be described more specifically. FIG. 12A is a planar view that illustrates the synthesized image 111C generated when the vehicle 1 goes in reverse for the purpose of parking the vehicle 1 into the parking space. The synthesized image 111C generated in this case is same as the synthesized image 111C generated in the first specific example when the vehicle 1 goes in reverse. Therefore, as described above, there is a relatively high possibility that the synthesized image 111C includes the target to which the occupant should pay attention when the vehicle 1 goes in reverse (especially, the target to which the occupant should pay attention when the vehicle 1 goes in reverse for the purpose of parking the vehicle 1 into the parking space).

Figure 12B:
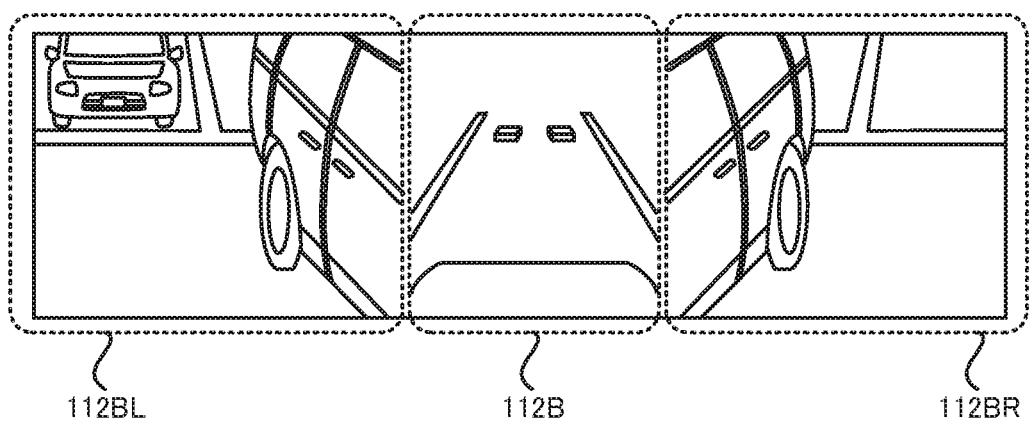
FIG. 12B is a planar view that illustrates the synthesized image generated when the vehicle goes in reverse for the purpose of getting the vehicle out of the parking space.

On the other hand, FIG. 12B is a planar view that illustrates the synthesized image 111C generated when the vehicle 1 goes in reverse for the purpose of getting the vehicle 1 out of the parking space. As illustrated in FIG. 12A and FIG. 12B, when the vehicle 1 goes in reverse for the purpose of getting the vehicle 1 out of the parking space, the synthesized image 111C includes a scene from which the occupant is allowed to see a field (in other words, taking a view) that is relatively far from the vehicle 1 in a lateral direction of the vehicle 1. Thus, there is a relatively high possibility that the synthesized image 111C includes another vehicle and the like traveling at a driving space to approach the vehicle 1 that is moving out of the parking space. Namely, there is a relatively high possibility that the synthesized image 111C includes the target to which the occupant should pay attention when the vehicle 1 goes in reverse (for example, another vehicle and the like traveling at the driving space to approach the vehicle 1 that is moving out of the parking space, in addition to another vehicle 2 and the like parked around the parking space out of which the vehicle 1 is got).

Considering the difference between the synthesized image 111C that is generated when the vehicle 1 goes in reverse for the purpose of parking the vehicle 1 into the parking space and that is illustrated in FIG. 12A and the synthesized image 111C that is generated when the vehicle 1 goes in reverse for the purpose of getting the vehicle 1 out of the parking space and that is illustrated in FIG. 12B, the process of extracting the image part corresponding to the side imaging range when the vehicle 1 goes in reverse for the purpose of getting the vehicle 1 out of the parking space (namely, the process at the step S23 in FIG. 10) is substantially equivalent to a process of generating the synthesized image 111C so that the synthesized image 111C generated when the vehicle 1 goes in reverse for the purpose of getting the vehicle 1 out of the parking space includes a third scene that is at the left and/or at the right of a fourth scene that is included in the synthesized image 111C generated when the vehicle 1 goes in reverse for the purpose of parking the vehicle 1 into the parking space.

Note that sizes of the rear left image 112BL_S and the rear right image 112BR_S extracted when the vehicle 1 goes in reverse for the purpose of getting the vehicle 1 out of the parking space are larger than sizes of the rear left image 112BL_L and the rear right image 112BR_L extracted when the vehicle 1 goes in reverse for the purpose of parking the vehicle 1 into the parking space, respectively. This is because the side imaging range IRBL_S and the side imaging range IRBR_S correspond to the imaging ranges obtained by expanding the lower imaging range IRBL_L and the lower imaging range IRBR_L, respectively. Thus, the image synthesizing unit 132 may generate the synthesized image 111C so that a ratio of an area in which each of the rear left image 112BL and the rear right image 112BR is displayed in the synthesized image 111C with respect to the synthesized image 111C in the case where the vehicle 1 goes in reverse for the purpose of getting the vehicle 1 out of the parking space is larger than the ratio in the case where the vehicle 1 goes in reverse for the purpose of parking the vehicle 1 into the parking space. Moreover, as the ratio of the area in which each of the rear left image 112BL and the rear right image 112BR is displayed in the synthesized image 111C with respect to the synthesized image 111C becomes larger, a ratio of an area in which the rear image 112B is displayed in the synthesized image 111C with respect to the synthesized image 111C becomes smaller naturally. Thus, the image synthesizing unit 132 may extract the rear image 112B so that the size of the rear image 112B extracted when the vehicle 1 goes in reverse for the purpose of getting the vehicle 1 out of the parking space is smaller than the size of the rear image 112B extracted when the vehicle 1 goes in reverse for the purpose of parking the vehicle 1 into the parking space. Alternatively, when the vehicle 1 goes in reverse for the purpose of getting the vehicle 1 out of the parking space, the image synthesizing unit 132 may extract the rear image 112B having the size that is same as the size of the rear image 112B extracted when the vehicle 1 goes in reverse for the purpose of parking the vehicle 1 into the parking space, then minify the extracted rear image 112B (typically, minify the extracted rear image 112B in the horizontal direction), and then generate the synthesized image 111C by using the minified rear image 112B. Note that FIG. 12B illustrates an example of the synthesized image 111C generated by using the minified rear image 112B.

Again in FIG. 10, on the other hand, as a result of the determination at the step S22, if it is determined that the vehicle 1 does not go in reverse for the purpose of getting the vehicle 1 out of the parking space (the step S22: No), the vehicle 1 is presumed to go in reverse for another purpose that is different from the purpose of parking the vehicle 1 into the parking space and the purpose of getting the vehicle 1 out of the parking space. In this case, the process at the step S12 that is also executed in the first specific example is executed.

As described above, the second specific example of the image display operation can achieve a technical effect that is same as the technical effect achieved by the first specific example of the image display operation. Moreover in the second specific example, the image synthesizing unit 132 is capable of generating the synthesized image 111C that is useful for the occupant when the vehicle 1 goes in reverse. The reason is as follows. The target to which the occupant should pay attention when the vehicle 1 goes in reverse for the purpose of parking the vehicle 1 into the parking space is not necessarily same as the target to which the occupant should pay attention when the vehicle 1 goes in reverse for the purpose of getting the vehicle 1 out of the parking space. For example, when the vehicle 1 goes in reverse for the purpose of parking the vehicle 1 into the parking space, it is preferable that the occupant pay attention to at least one of the white line of the parking space that indicates a position where the vehicle 1 should be parked and another parked vehicle adjacent to the parking space. On the other hand, when the vehicle 1 goes in reverse for the purpose of getting the vehicle 1 out of the parking space, it is preferable that the occupant pay attention to at least one of another parked vehicle adjacent to the parking space and another vehicle traveling in the driving space that leads to the parking space. Thus, in the second specific example, the occupant can drive the vehicle 1 in reverse appropriately while seeing surrounding circumstance of the vehicle 1 more appropriately, because the content of the synthesized image 111C is changed on the basis of the purpose of the vehicle 1 going in reverse. Namely, the occupant can drive the vehicle 1 in reverse appropriately while seeing surrounding circumstance of the vehicle 1 more appropriately, regardless of the purpose of the vehicle 1 going in reverse.

(2-2-2) Modified Example of Second Specific Example of Image Display Operation

In the above described description, the image synthesizing unit 132 adjusts the position of the rear left image 112BL extracted from the rear left image 111BL and the position of the rear right image 112BR extracted from the rear right image 111BR on the basis of the purpose of the vehicle 1 going in reverse, in order to generate the synthesized image 111C that includes the scene positioned at the relatively left side and/or at the relatively right side when the vehicle 1 goes in reverse for the purpose of getting the vehicle 1 out of the parking space. Namely, the image synthesizing unit 132 generates the synthesized image 111C that includes the scene positioned at the relatively left side and/or at the relatively right side by executing an image process (an image processing) on the rear left image 111BL (furthermore, the rear image 111B and the rear right image 111BR). However, the image synthesizing unit 132 may generate the synthesized image 111C that includes the scene positioned at the relatively left side and/or at the relatively right side by using another method. Note that the above described example of the method of generating the synthesized image 111C that includes the relatively lower scene, which is already described in the first specific example, may be used as one example of the method of generating the synthesized image 111C that includes the scene positioned at the relatively left side and/or at the relatively right side.

Figure 13:
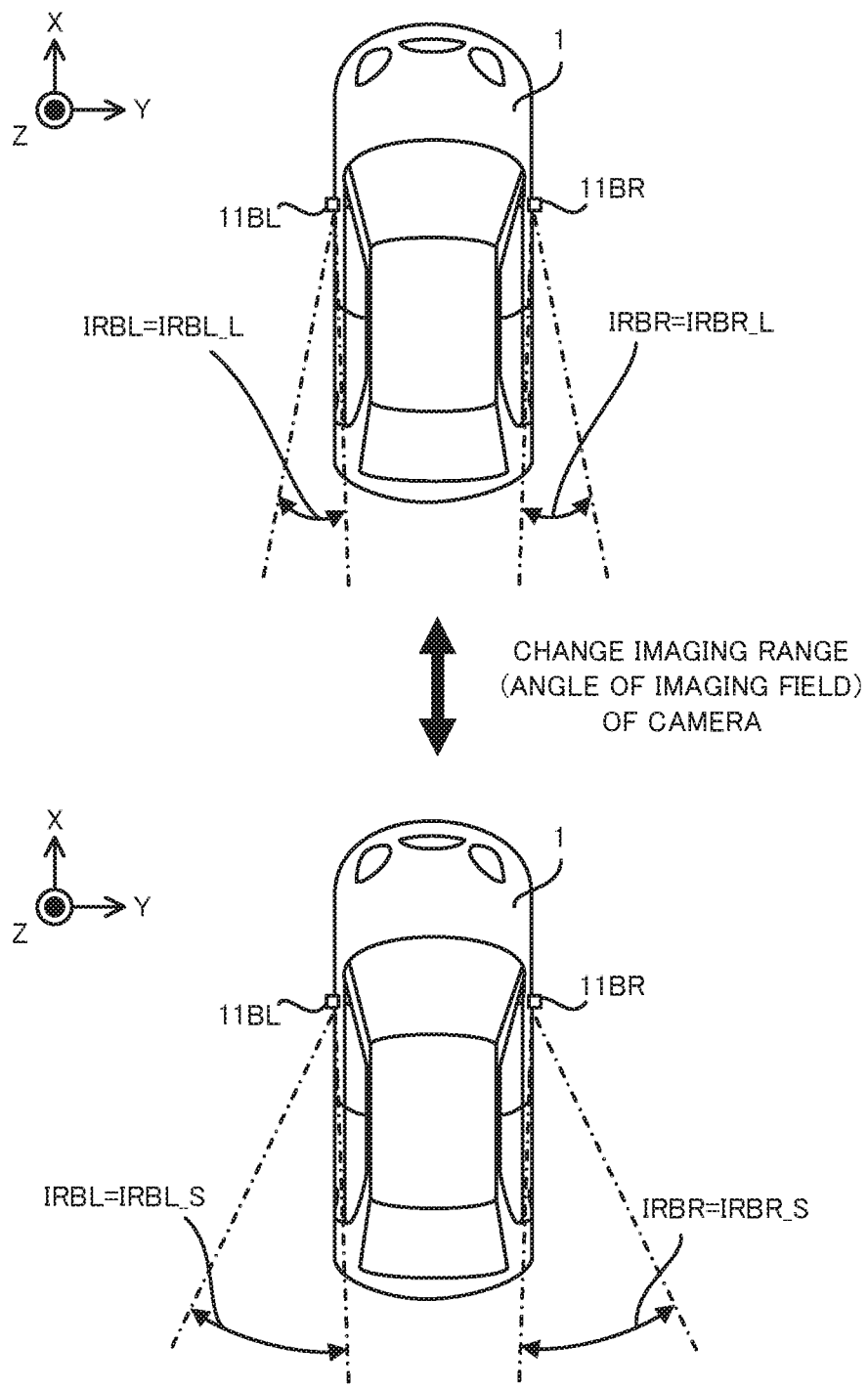
FIG. 13 is a planar view that illustrates the adjusted imaging range of each of the rear left camera and the rear right camera when the vehicle goes in reverse for the purpose of parking the vehicle into the parking space and the adjusted imaging range of each of the rear left camera and the rear right camera when the vehicle goes in reverse for the purpose of getting the vehicle out of the parking space.

Namely, the image synthesizing unit 132 may generate the synthesized image 111C that includes the scene positioned at the relatively left side and/or at the relatively right side by controlling the rear left camera 11BL and the rear right camera 11BR. Specifically, the image synthesizing unit 132 may control the rear left camera 11BL and the rear right camera 11BR so that the imaging range IRBL of the rear left camera 11BL is same as the above described lower imaging range IRBL_L and the imaging range IRBR of the rear right camera 11BR is same as the above described lower imaging range IRBR_L as illustrated in an upper diagram of FIG. 13, when the vehicle 1 goes in reverse for the purpose of parking the vehicle 1 into the parking space. On the other hand, the image synthesizing unit 132 may control the rear left camera 11BL and the rear right camera 11BR so that the imaging range IRBL of the rear left camera 11BL is same as the above described side imaging range IRBL_S and the imaging range IRBR of the rear right camera 11BR is same as the above described side imaging range IRBR_S as illustrated in an lower diagram of FIG. 13, when the vehicle 1 goes in reverse for the purpose of getting the vehicle 1 out of the parking space.

Figure 14:
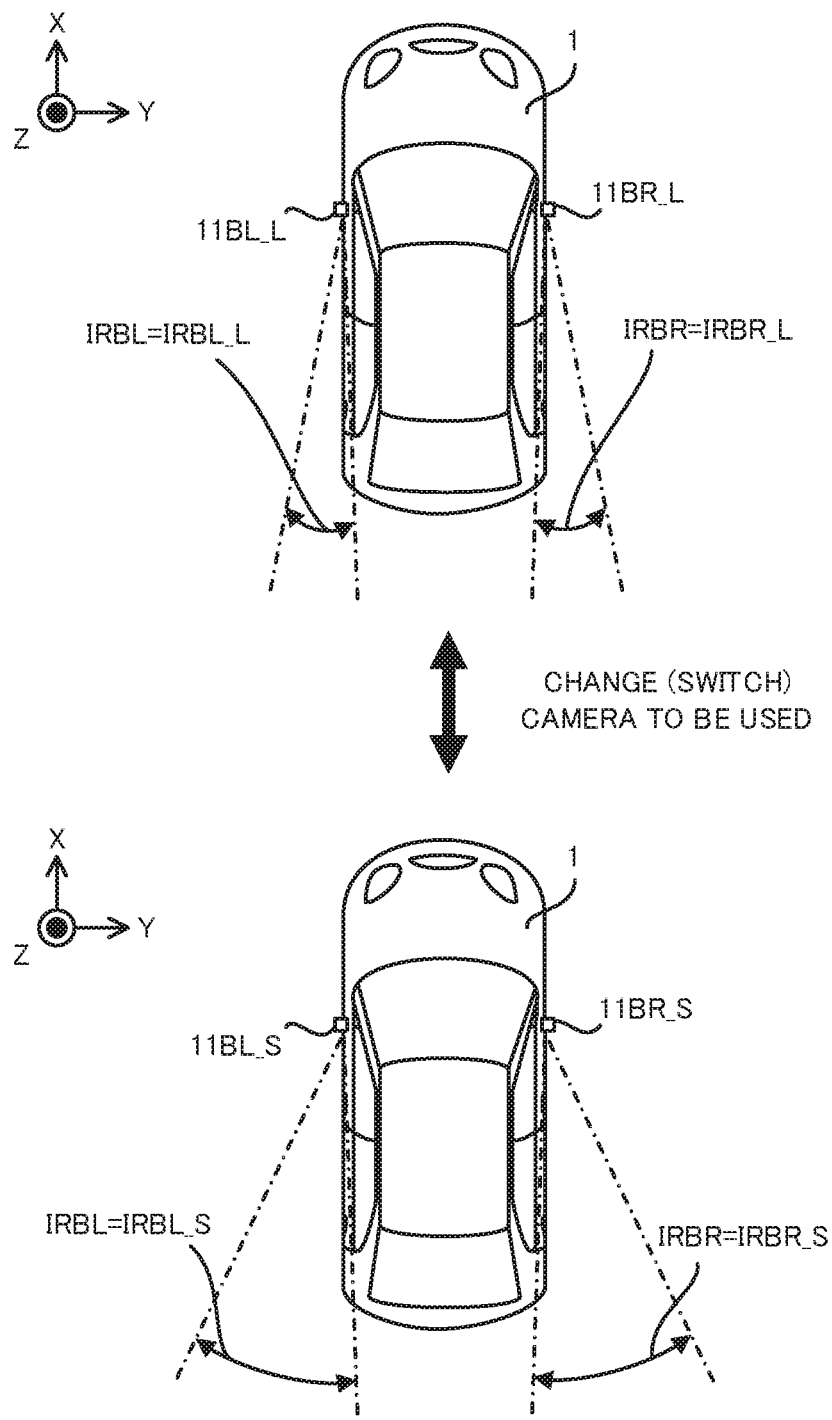
FIG. 14 is a planar view that illustrates the imaging range of each of one rear left camera and one rear right camera selected when the vehicle goes in reverse for the purpose of parking the vehicle into the parking space and the imaging range of each of the rear left camera and the rear right camera selected when the vehicle goes in reverse for the purpose of getting the vehicle out of the parking space.

Alternatively, when the vehicle 1 is provided with a plurality of rear left cameras 11BL which have different imaging ranges IRBL, respectively, the image synthesizing unit 132 may generate the synthesized image 111C that includes the scene positioned at the relatively left side and/or at the relatively right side by selecting, from the plurality of rear left cameras 11BL, one rear left camera 11BL that should actually capture the rear left image 111BL on the basis of the purpose of the vehicle 1 going in reverse. Specifically, the vehicle 1 may be provided with the rear left camera 11BL_L, a rear left camera 11BL_S, the rear right camera 11BR_L and a rear right camera 11BR_S. The imaging range IRBL of the rear left camera 11BL_L is same as the above described lower imaging range IRBL_L. The imaging range IRBL of the rear left camera 11BL_S is same as the above described side imaging range IRBL_S. The imaging range IRBR of the rear right camera 11BR_L is same as the above described lower imaging range IRBR_L. The imaging range IRBR of the rear right camera 11BR_S is same as the above described side imaging range IRBR_S. In this case, the image synthesizing unit 132 may control the rear left camera 11BL_L and the rear right camera 11BR_L to capture the rear left image 111BL and the rear right image 111BR, respectively, when the vehicle 1 goes in reverse for the purpose of parking the vehicle 1 into the parking space, as illustrated in an upper diagram of FIG. 14. On the other hand, the image synthesizing unit 132 may control the rear left camera 11BL_S and the rear right camera 11BR_S to capture the rear left image 111BL and the rear right image 111BR, respectively, when the vehicle 1 goes in reverse for the purpose of getting the vehicle 1 out of the parking space, as illustrated in a lower diagram of FIG. 14.

In the above described description, the side imaging range IRBL_S and the side imaging range IRBR_S are the imaging ranges that are obtained by expanding the lower imaging range IRBL_L and the lower imaging range IRBR_L, respectively. Thus, the side imaging range IRBL_S and the side imaging range IRBR_S are larger than the lower imaging range IRBL_L and the lower imaging range IRBR_L, respectively. However, the side imaging range IRBL_S may be any imaging range as long as the side imaging range IRBL_S includes the imaging range that is located at the left of the lower imaging range IRBL_L. Similarly, the side imaging range IRBR_S may be any imaging range as long as the side imaging range IRBR_S includes the imaging range that is located at the right of the lower imaging range IRBR_L.

In the above described description, when the vehicle 1 goes in reverse for the purpose of getting the vehicle 1 out of the parking space, the image synthesizing unit 132 uses the side imaging range IRBL_S and the side imaging range IRBR_S that are different from the lower imaging range IRBL_L and the lower imaging range IRBR_L used when the vehicle 1 goes in reverse for the purpose of parking the vehicle 1 into the parking space, respectively. However, even when the vehicle 1 goes in reverse for the purpose of getting the vehicle 1 out of the parking space, the image synthesizing unit 132 may use the lower imaging range IRBL_L and the lower imaging range IRBR_L used when the vehicle 1 goes in reverse for the purpose of parking the vehicle 1 into the parking space. However, in this case, it is preferable that the image synthesizing unit 132 increase the ratio of the area in which each of the rear left image 112BL and the rear right image 112BR is displayed in the synthesized image 111C with respect to the synthesized image 111C (see FIG. 12B), in order to improve a visibility of the rear left image 112BL and the rear right image 112BR in the synthesized image 111C. Namely, when the vehicle 1 goes in reverse for the purpose of getting the vehicle 1 out of the parking space, the image synthesizing unit 132 may extract the rear left image 112BL and the rear right image 112BR having sizes that are same as sizes of the rear left image 112BL and the rear right image 112BR extracted when the vehicle 1 goes in reverse for the purpose of parking the vehicle 1 into the parking space, then expand the extracted rear left image 112BL and the extracted rear right image 112BR (typically, expand in the horizontal direction), and then generate the synthesized image 111C by using the expanded rear left image 112BL and the expanded rear right image 112BR. Even in this case, the image synthesizing unit 132 is capable of generating the synthesized image 111C that is useful for the occupant when the vehicle 1 goes in reverse.

(3) Additional Statement

Relating to the above described embodiment, following additional statements will be disclosed.

(3-1) Additional Statement 1

An image display apparatus according to the additional statement 1 is provided with: a synthesizing device that is configured to synthesize a rear image and a rear side image to generate a synthesized image, wherein the rear image is captured by a rear imaging device that is configured to image a rear area located at the rear of a vehicle and the rear side image is captured by a rear side imaging device that is configured to image a rear side area located at the rear and the side of the vehicle; and a displaying device that is configured to display the synthesized image, the synthesizing device is configured to generate the synthesized image so that the synthesized image generated when the vehicle goes in reverse includes a first scene that is below, viewed from the vehicle, a second scene that is included in the synthesized image generated when the vehicle does not go in reverse.

Alternatively, an image display apparatus according to the additional statement 1 may be provided with: a controller is programmed to synthesize a rear image and a rear side image to generate a synthesized image, wherein the rear image is captured by a rear imager that is configured to image a rear area located at the rear of a vehicle and the rear side image is captured by a rear side imager that is configured to image a rear side area located at the rear and the side of the vehicle; and a display that is configured to display the synthesized image, the controller is programmed to generate the synthesized image so that a method of generating the synthesized image when the vehicle goes in reverse for the purpose of parking the vehicle into a parking space is different from a method of generating the synthesized image when the vehicle goes in reverse for the purpose of getting the vehicle out of a parking space.

In the image display apparatus according to the additional statement 1, the synthesizing device (alternatively, the controller, the same applies to the additional statement) is capable of generating the synthesized image so that the synthesized image generated when the vehicle goes in reverse includes the first scene that is positioned below the second scene that is included in the synthesized image generated when the vehicle does not go in reverse. As a result, when the vehicle goes in reverse, the displaying device (alternatively, the display, the same applies to the additional statement) displays the synthesized image that includes a relatively lower scene (for example, a scene including a road around the vehicle). Thus, an occupant of the vehicle can see more appropriately whether or not there is any accident that prevents the vehicle from going in reverse, compared to the case where the synthesized image including a relatively upper scene (for example, a scene that is far away from the vehicle) is displayed when the vehicle goes in reverse. Moreover, the occupant can appropriately see a condition (for example, a position) of the vehicle going in reverse. Namely, the image display apparatus according to the additional statement 1 is capable of generating the synthesized image that is useful for the occupant (for example, the synthesized image that is useful to drive the vehicle in reverse relatively easily) when the vehicle goes in reverse.

(3-2) Additional Statement 2

An image display apparatus according to the additional statement 2 is the image display apparatus according to the additional statement 1, wherein the synthesizing device is configured to generate the synthesized image so that the synthesized image includes at least one portion of the vehicle when the vehicle goes in reverse.

Alternatively, an image display apparatus according to the additional statement 2 may be the image display apparatus according to the additional statement 1, wherein the controller is programmed to generate the synthesized image so that the synthesized image includes at least one portion of the vehicle when the vehicle goes in reverse.

The image display apparatus according to the additional statement 2 allows the occupant to appropriately see, from the synthesized image, whether or not there is any accident that prevents the vehicle from going in reverse. Moreover, the image display apparatus according to the additional statement 2 allows the occupant to see the condition of the vehicle going in reverse more appropriately from the condition (for example, the position) of the vehicle in the synthesized image.

(3-3) Additional Statement 3

An image display apparatus according to the additional statement 3 is the image display apparatus according to the additional statement 2, wherein the synthesizing device is configured to generate the synthesized image so that the synthesized image includes at least one portion of the vehicle and a road when the vehicle goes in reverse.

Alternatively, an image display apparatus according to the additional statement 3 may be the image display apparatus according to the additional statement 2, wherein the controller is programmed to generate the synthesized image so that the synthesized image includes at least one portion of the vehicle and a road when the vehicle goes in reverse.

The image display apparatus according to the additional statement 3 allows the occupant to appropriately see, from the synthesized image, whether or not there is any accident that prevents the vehicle from going in reverse on the road around the vehicle. Moreover, the image display apparatus according to the additional statement 3 allows the occupant to see the condition of the vehicle going in reverse more appropriately from the condition (for example, the position on the road) of the vehicle in the synthesized image.

(3-4) Additional Statement 4

An image display apparatus according to the additional statement 4 is the image display apparatus according to the additional statement 2 or 3, wherein at least one portion of the vehicle includes at least one portion of a rear wheel and/or at least one portion of a body of the vehicle.

The image display apparatus according to the additional statement 4 allows the occupant to appropriately see, from the synthesized image, whether or not there is any accident that prevents the vehicle from going in reverse around the vehicle. Moreover, the image display apparatus according to the additional statement 4 allows the occupant to see the condition of the vehicle going in reverse more appropriately from the condition (for example, at least one of a position of the rear wheel and a position of the body) of the vehicle in the synthesized image.

(3-5) Additional Statement 5

An image display apparatus according to the additional statement 5 is the image display apparatus according to any one of the additional statements 2 to 4, wherein the synthesizing device is configured to generate the synthesized image in which a scene in the rear image and a scene in the rear side image are seamlessly connected at a border between the rear image and the rear side image when the vehicle does not go in reverse, the synthesizing device is configured to generate the synthesized image after allowing the scene in the rear image and the scene in the rear side image not to be seamlessly connected at the border between the rear image and the rear side image when the vehicle goes in reverse.

Alternatively, an image display apparatus according to the additional statement 5 may be the image display apparatus according to any one of the additional statements 2 to 4, wherein the controller is programmed to generate the synthesized image in which a scene in the rear image and a scene in the rear side image are seamlessly connected at a border between the rear image and the rear side image when the vehicle does not go in reverse, the controller is programmed to generate the synthesized image after allowing the scene in the rear image and the scene in the rear side image not to be seamlessly connected at the border between the rear image and the rear side image when the vehicle goes in reverse.

There is a possibility that it is difficult to seamlessly connect the scene in the rear image and the scene in the rear side image when the synthesized image includes at least one of the rear wheel and the body due to the vehicle going in reverse. In this case, the image display apparatus according to the additional statement 5 allows the scene in the rear image and the scene in the rear side image not to be seamlessly connected. Thus, the synthesizing device is not necessarily forced to synthesize the rear image and the rear side image seamlessly, when it is difficult to seamlessly connect the scene in the rear image and the scene in the rear side image.

(3-6) Additional Statement 6

An image display apparatus according to the additional statement 6 is the image display apparatus according to any one of the additional statements 1 to 5, wherein the synthesizing device is configured to generate the synthesized image so that a method of generating the synthesized image when the vehicle goes in reverse for the purpose of parking the vehicle into a parking space is different from a method of generating the synthesized image when the vehicle goes in reverse for the purpose of getting the vehicle out of a parking space.

Alternatively, an image display apparatus according to the additional statement 6 may be the image display apparatus according to any one of the additional statements 1 to 5, wherein the controller is programmed to generate the synthesized image so that a method of generating the synthesized image when the vehicle goes in reverse for the purpose of parking the vehicle into a parking space is different from a method of generating the synthesized image when the vehicle goes in reverse for the purpose of getting the vehicle out of a parking space.

The image display apparatus according to the additional statement 6 displays the synthesized image based on the purpose of the vehicle going in reverse. Thus, the occupant can see surrounding circumstance of the vehicle more appropriately while driving the vehicle in reverse, not only when the purpose of the vehicle going in reverse is to park the vehicle into the parking space but also when the purpose of the vehicle going in reverse is to get the vehicle out of the parking space.

(3-7) Additional Statement 7

An image display apparatus according to the additional statement 7 is provided with: a synthesizing device that is configured to synthesize a rear image and a rear side image to generate a synthesized image, wherein the rear image is captured by a rear imaging device that is configured to image a rear area located at the rear of a vehicle and the rear side image is captured by a rear side imaging device that is configured to image a rear side area located at the rear and the side of the vehicle; and a displaying device that is configured to display the synthesized image, the synthesizing device is configured to generate the synthesized image so that a method of generating the synthesized image when the vehicle goes in reverse for the purpose of parking the vehicle into a parking space is different from a method of generating the synthesized image when the vehicle goes in reverse for the purpose of getting the vehicle out of a parking space.

Alternatively, an image display apparatus according to the additional statement 7 may be provided with: a controller is programmed to synthesize a rear image and a rear side image to generate a synthesized image, wherein the rear image is captured by a rear imager that is configured to image a rear area located at the rear of a vehicle and the rear side image is captured by a rear side imager that is configured to image a rear side area located at the rear and the side of the vehicle; and a display that is configured to display the synthesized image, the controller is programmed to generate the synthesized image so that a method of generating the synthesized image when the vehicle goes in reverse for the purpose of parking the vehicle into a parking space is different from a method of generating the synthesized image when the vehicle goes in reverse for the purpose of getting the vehicle out of a parking space.

The image display apparatus according to the additional statement 7 allows the occupant to see the surrounding circumstance of the vehicle more appropriately while driving the vehicle in reverse, not only when the purpose of the vehicle going in reverse is to park the vehicle into the parking space but also when the purpose of the vehicle going in reverse is to get the vehicle out of the parking space, as with the image display apparatus according to the additional statement 6. Namely, the image display apparatus according to the additional statement 7 is capable of generating the synthesized image that is useful for the occupant (for example, the synthesized image that is optimized on the basis of the purpose of the vehicle going in reverse) when the vehicle goes in reverse.

(3-8) Additional Statement 8

An image display apparatus according to the additional statement 8 is the image display apparatus according to the additional statement 6 or 7, wherein the synthesizing device is configured to determine that the vehicle goes in reverse for the purpose of parking the vehicle into the parking space when a gear range of the vehicle is changed from a D range to a R range, the synthesizing device is configured to determine that the vehicle goes in reverse for the purpose of getting the vehicle out of the parking space when the gear range of the vehicle is changed from a P range to the R range.

Alternatively, an image display apparatus according to the additional statement 8 may be the image display apparatus according to the additional statement 6 or 7, wherein the controller is programmed to determine that the vehicle goes in reverse for the purpose of parking the vehicle into the parking space when a gear range of the vehicle is changed from a D range to a R range, the controller is programmed to determine that the vehicle goes in reverse for the purpose of getting the vehicle out of the parking space when the gear range of the vehicle is changed from a P range to the R range.

In the image display apparatus according to the additional statement 8, the synthesizing device is capable of determining whether the purpose of the vehicle going in reverse is a first purpose of parking the vehicle into the parking space or a second purpose of getting the vehicle out of the parking space. Therefore, the synthesizing device is capable of changing the method of generating the synthesized image on the basis of the purpose of the vehicle going in reverse by using this determination result.

(3-9) Additional Statement 9

An image display apparatus according to the additional statement 9 is the image display apparatus according to any one of the additional statements 6 to 8, wherein the synthesizing device is configured to generate the synthesized image so that the synthesized image generated when the vehicle goes in reverse for the purpose of getting the vehicle out of the parking space includes a third scene that is at the left and/or at the right of a fourth scene that is included in the synthesized image generated when the vehicle goes in reverse for the purpose of parking the vehicle into the parking space.

Alternatively, an image display apparatus according to the additional statement 9 may be the image display apparatus according to any one of the additional statements 6 to 8, wherein the controller is programmed to generate the synthesized image so that the synthesized image generated when the vehicle goes in reverse for the purpose of getting the vehicle out of the parking space includes a third scene that is at the left and/or at the right of a fourth scene that is included in the synthesized image generated when the vehicle goes in reverse for the purpose of parking the vehicle into the parking space.

In the image display apparatus according to the additional statement 9, the synthesizing device is capable of generating the synthesized image so that the synthesized image generated when the vehicle goes in reverse for the purpose of getting the vehicle out of the parking space includes the third scene that is at the left and/or at the right, viewed from the vehicle, of the fourth scene that is included in the synthesized image generated when the vehicle goes in reverse for the purpose of parking the vehicle into the parking space. Thus, when the vehicle goes in reverse for the purpose of getting the vehicle out of the parking space, the occupant can see the circumstance at the right and/or at the left of the vehicle more appropriately. Thus, the occupant can appropriately pay attention to a target (for example, at least one of another parked vehicle adjacent to the parking space and another vehicle traveling in a driving space that leads to the parking space) to which the occupant should pay attention when the vehicle goes in reverse for the purpose of getting the vehicle out of the parking space, from the synthesized image.

(3-10) Additional Statement 10

An image display apparatus according to the additional statement 10 is the image display apparatus according to any one of the additional statements 6 to 9, wherein the synthesizing device is configured to generate the synthesized image so that a ratio of an area in which the rear side image is displayed in the synthesized image with respect to the synthesized image in the case where the vehicle goes in reverse for the purpose of getting the vehicle out of the parking space is larger than the ratio in the case where the vehicle goes in reverse for the purpose of parking the vehicle into the parking space.

Alternatively, an image display apparatus according to the additional statement 10 may be the image display apparatus according to any one of the additional statements 6 to 9, wherein the controller is programmed to generate the synthesized image so that a ratio of an area in which the rear side image is displayed in the synthesized image with respect to the synthesized image in the case where the vehicle goes in reverse for the purpose of getting the vehicle out of the parking space is larger than the ratio in the case where the vehicle goes in reverse for the purpose of parking the vehicle into the parking space.

The image display apparatus according to the additional statement 10 improve a visibility of the rear side image in the synthesized image when the vehicle goes in reverse for the purpose of getting the vehicle out of the parking space. Thus, the occupant can see the circumstance at the rear and at the right and or at the left of the vehicle more appropriately. Thus, the occupant can appropriately pay attention to the target to which the occupant should pay attention when the vehicle goes in reverse for the purpose of getting the vehicle out of the parking space, from the synthesized image.

(3-11) Additional Statement 11

An image display apparatus according to the additional statement 11 is the image display apparatus according to any one of the additional statements 1 to 6, wherein the synthesizing device is configured to extract a rear image part that is at least one portion of the rear image and a rear side image part that is at least one portion of the rear side image and to generate the synthesized image by synthesizing the rear image part and the rear side image part, the synthesizing device is configured to extract the rear image part so that the rear image part extracted when the vehicle goes in reverse includes an image part that is positioned under the rear image part extracted when the vehicle does not go in reverse. Alternatively, an image display apparatus according to the additional statement 11 may be the image display apparatus according to any one of the additional statements 1 to 6, wherein the controller is programmed to extract a rear image part that is at least one portion of the rear image and a rear side image part that is at least one portion of the rear side image and to generate the synthesized image by synthesizing the rear image part and the rear side image part, the controller is programmed to extract the rear image part so that the rear image part extracted when the vehicle goes in reverse includes an image part that is positioned under the rear image part extracted when the vehicle does not go in reverse. Namely, the image display apparatus according to the additional statement 11 may execute an image process (namely, an image processing) on the rear image to generate the synthesized image that satisfies a first requirement that is "the synthesized image generated when the vehicle goes in reverse including the first scene that is below, viewed from the vehicle, the second scene that is included in the synthesized image generated when the vehicle does not go in reverse".

(3-12) Additional Statement 12

An image display apparatus according to the additional statement 12 is the image display apparatus according to any one of the additional statements 1 to 6 and 11, wherein the synthesizing device is configured to extract a rear image part that is at least one portion of the rear image and a rear side image part that is at least one portion of the rear side image and to generate the synthesized image by synthesizing the rear image part and the rear side image part, the synthesizing device is configured to extract the rear side image part so that the rear side image part extracted when the vehicle goes in reverse includes an image part that is positioned under the rear side image part extracted when the vehicle does not go in reverse. Alternatively, an image display apparatus according to the additional statement 12 may be the image display apparatus according to any one of the additional statements 1 to 6 and 11, wherein the controller is programmed to extract a rear image part that is at least one portion of the rear image and a rear side image part that is at least one portion of the rear side image and to generate the synthesized image by synthesizing the rear image part and the rear side image part, the controller is programmed to extract the rear image part so that the rear side image part extracted when the vehicle goes in reverse includes an image part that is positioned under the rear side image part extracted when the vehicle does not go in reverse. Namely, the image display apparatus according to the additional statement 12 may execute an image process on the rear side image to generate the synthesized image that satisfies the above described first requirement.

(3-13) Additional Statement 13

An image display apparatus according to the additional statement 13 is the image display apparatus according to any one of the additional statements 1 to 6 and 11 to 12, wherein the synthesizing device is configured to adjust an operational parameter of the rear imaging device so that an imaging range of the rear imaging device when the vehicle goes in reverse includes a range (a field) that is below the imaging range of the rear imaging device when the vehicle does not go in reverse. Alternatively, an image display apparatus according to the additional statement 13 may be the image display apparatus according to any one of the additional statements 1 to 6 and 11 to 12, wherein the controller is programmed to adjust an operational parameter of the rear imager so that an imaging range of the rear imager when the vehicle goes in reverse includes a range (a field) that is below the imaging range of the rear imager when the vehicle does not go in reverse. Namely, the image display apparatus according to the additional statement 13 may control the rear imaging device or the rear imager (especially, adjust the imaging range of the rear imaging device or the rear imager) to generate the synthesized image that satisfies the above described first requirement.

(3-14) Additional Statement 14

An image display apparatus according to the additional statement 14 is the image display apparatus according to any one of the additional statements 1 to 6 and 11 to 13, wherein the synthesizing device is configured to adjust an operational parameter of the rear side imaging device so that an imaging range of the rear side imaging device when the vehicle goes in reverse includes a range (a field) that is below the imaging range of the rear side imaging device when the vehicle does not go in reverse. Alternatively, an image display apparatus according to the additional statement 14 may be the image display apparatus according to any one of the additional statements 1 to 6 and 11 to 13, wherein the controller is programmed to adjust an operational parameter of the rear side imager so that an imaging range of the rear side imager when the vehicle goes in reverse includes a range (a field) that is below the imaging range of the rear side imager when the vehicle does not go in reverse. Namely, the image display apparatus according to the additional statement 14 may control the rear side imaging device or the rear side imager (especially, adjust the imaging range of the rear side imaging device or the rear side imager) to generate the synthesized image that satisfies the above described first requirement.

(3-15) Additional Statement 15

An image display apparatus according to the additional statement 15 is the image display apparatus according to any one of the additional statements 1 to 6 and 11 to 14, wherein the vehicle is provided with a first rear imaging device that is configured to image a first imaging range and a second rear imaging device that is configured to image a second imaging range including a range (a field) that is below the first imaging range, the synthesizing device is configured to generate the synthesized image by synthesizing the rear image captured by the first rear imaging device and the rear side image when the vehicle does not go in reverse, the synthesizing device is configured to generate the synthesized image by synthesizing the rear image captured by the second rear imaging device and the rear side image when the vehicle goes in reverse. Alternatively, an image display apparatus according to the additional statement 15 may be the image display apparatus according to any one of the additional statements 1 to 6 and 11 to 14, wherein the vehicle is provided with a first rear imager that is configured to image a first imaging range and a second rear imager that is configured to image a second imaging range including a range (a field) that is below the first imaging range, the controller is programmed to generate the synthesized image by synthesizing the rear image captured by the first rear imager and the rear side image when the vehicle does not go in reverse, the controller is configured to generate the synthesized image by synthesizing the rear image captured by the second rear imager and the rear side image when the vehicle goes in reverse. Namely, the image display apparatus according to the additional statement 15 may select one rear imaging device or one rear imager that should actually capture the rear image from the plurality of rear imaging devices or the plurality of rear imagers to generate the synthesized image that satisfies the above described first requirement.

(3-16) Additional Statement 16

An image display apparatus according to the additional statement 16 is the image display apparatus according to any one of the additional statements 1 to 6 and 11 to 15, wherein the vehicle is provided with a first rear side imaging device that is configured to image a third imaging range and a second rear side imaging device that is configured to image a fourth imaging range including a range (a field) that is below the third imaging range, the synthesizing device is configured to generate the synthesized image by synthesizing the rear side image captured by the first rear side imaging device and the rear image when the vehicle does not go in reverse, the synthesizing device is configured to generate the synthesized image by synthesizing the rear side image captured by the second rear side imaging device and the rear image when the vehicle goes in reverse. Alternatively, an image display apparatus according to the additional statement 16 may be the image display apparatus according to any one of the additional statements 1 to 6 and 11 to 15, wherein the vehicle is provided with a first rear side imager that is configured to image a third imaging range and a second rear side imager that is configured to image a fourth imaging range including a range (a field) that is below the third imaging range, the controller is programmed to generate the synthesized image by synthesizing the rear side image captured by the first rear side imager and the rear image when the vehicle does not go in reverse, the controller is configured to generate the synthesized image by synthesizing the rear side image captured by the second rear side imager and the rear image when the vehicle goes in reverse. Namely, the image display apparatus according to the additional statement 16 may select one rear side imaging device or one rear side imager that should actually capture the rear side image from the plurality of rear side imaging devices or the plurality of rear side imagers to generate the synthesized image that satisfies the above described first requirement.

(3-17) Additional Statement 17

An image display apparatus according to the additional statement 17 is the image display apparatus according to the additional statement 9, wherein the synthesizing device is configured to extract a rear image part that is at least one portion of the rear image and a rear side image part that is at least one portion of the rear side image and to generate the synthesized image by synthesizing the rear image part and the rear side image part, the synthesizing device is configured to extract the rear side image part so that the rear side image part extracted when the vehicle goes in reverse for the purpose of getting the vehicle out of the parking space includes an image part that is positioned at the left and/or at the right of the rear side image part extracted when the vehicle goes in reverse for the purpose of parking the vehicle into the parking space. Alternatively, an image display apparatus according to the additional statement 17 may be the image display apparatus according to the additional statement 9, wherein the controller is programmed to extract a rear image part that is at least one portion of the rear image and a rear side image part that is at least one portion of the rear side image and to generate the synthesized image by synthesizing the rear image part and the rear side image part, the controller is programmed to extract the rear side image part so that the rear side image part extracted when the vehicle goes in reverse for the purpose of getting the vehicle out of the parking space includes an image part that is positioned at the left and/or at the right of the rear side image part extracted when the vehicle goes in reverse for the purpose of parking the vehicle into the parking space. Namely, the image display apparatus according to the additional statement 17 may execute an image process on the rear side image to generate the synthesized image that satisfies a second requirement that is "the synthesized image generated when the vehicle goes in reverse for the purpose of getting the vehicle out of the parking space including the third scene that is at the left and/or at the right of the fourth scene that is included in the synthesized image generated when the vehicle goes in reverse for the purpose of parking the vehicle into the parking space".

(3-18) Additional Statement 18

An image display apparatus according to the additional statement 18 is the image display apparatus according to the additional statement 9 or 17, wherein the synthesizing device is configured to adjust an operational parameter of the rear side imaging device so that an imaging range of the rear side imaging device when the vehicle goes in reverse for the purpose of getting the vehicle out of the parking space includes a range (a field) that is at the left and/or at the right of the imaging range of the rear side imaging device when the vehicle goes in reverse for the purpose of parking the vehicle into the parking space. Alternatively, an image display apparatus according to the additional statement 18 may be the image display apparatus according to the additional statement 9 or 17, wherein the controller is programmed to adjust an operational parameter of the rear side imager so that an imaging range of the rear side imager when the vehicle goes in reverse for the purpose of getting the vehicle out of the parking space includes a range (a field) that is at the left and/or at the right of the imaging range of the rear side imager when the vehicle goes in reverse for the purpose of parking the vehicle into the parking space. Namely, the image display apparatus according to the additional statement 18 may control the rear side imaging device or the rear side imager (especially, adjust the imaging range of the rear side imaging device or the rear side imager) to generate the synthesized image that satisfies the above described second requirement.

(3-19) Additional Statement 19

An image display apparatus according to the additional statement 19 is the image display apparatus according to any one of the additional statements 9 and 17 to 18, wherein the vehicle is provided with a third rear side imaging device that is configured to image a fifth imaging range and a fourth rear side imaging device that is configured to image a sixth imaging range including a range (a field) that is at the right and/or at the left of the fifth imaging range, the synthesizing device is configured to generate the synthesized image by synthesizing the rear side image captured by the third rear side imaging device and the rear image when the vehicle goes in reverse for the purpose of parking the vehicle into the parking space, the synthesizing device is configured to generate the synthesized image by synthesizing the rear side image captured by the fourth rear side imaging device and the rear image when the vehicle goes in reverse for the purpose of getting the vehicle out of the parking space. Alternatively, an image display apparatus according to the additional statement 19 may be the image display apparatus according to any one of the additional statements 9 and 17 to 18, wherein the vehicle is provided with a third rear side imager that is configured to image a fifth imaging range and a fourth rear side imager that is configured to image a sixth imaging range including a range (a field) that is at the right and/or at the left of the fifth imaging range, the controller is programmed to generate the synthesized image by synthesizing the rear side image captured by the third rear side imager and the rear image when the vehicle goes in reverse for the purpose of parking the vehicle into the parking space, the controller is programmed to generate the synthesized image by synthesizing the rear side image captured by the fourth rear side imager and the rear image when the vehicle goes in reverse for the purpose of getting the vehicle out of the parking space. Namely, the image display apparatus according to the additional statement 19 may select one rear side imaging device or one rear side imager that should actually capture the rear side image from the plurality of rear side imaging devices or the plurality of rear side imagers to generate the synthesized image that satisfies the above described second requirement.

(3-20) Additional Statement 20

An image display apparatus according to the additional statement 20 is the image display apparatus according to the additional statement 10, wherein the synthesizing device is configured to extract a rear image part that is at least one portion of the rear image and a rear side image part that is at least one portion of the rear side image and to generate the synthesized image by synthesizing the rear image part and the rear side image part, when the vehicle goes in reverse for the purpose of getting the vehicle out of the parking space, the synthesizing device is configured to extract the rear side image part positioned at a first position that is same as a second position at which the rear side image part is extracted when the vehicle goes in reverse for the purpose of parking the vehicle into the parking space, to expand (enlarge) the extracted rear side image part and to generate the synthesized image by synthesizing the rear image part and the expanded rear side image part. Alternatively, an image display apparatus according to the additional statement 20 may be the image display apparatus according to the additional statement 10, wherein the controller is programmed to extract a rear image part that is at least one portion of the rear image and a rear side image part that is at least one portion of the rear side image and to generate the synthesized image by synthesizing the rear image part and the rear side image part, when the vehicle goes in reverse for the purpose of getting the vehicle out of the parking space, the synthesizing device is configured to extract the rear side image part positioned at a first position that is same as a second position at which the rear side image part is extracted when the vehicle goes in reverse for the purpose of parking the vehicle into the parking space, to expand (enlarge) the extracted rear side image part and to generate the synthesized image by synthesizing the rear image part and the expanded rear side image part. Namely, the image display apparatus according to the additional statement 20 may execute an image process on the rear side image to generate the synthesized image that satisfies a third requirement that is "the ratio of the area in which the rear side image is displayed to the synthesized image in the case where the vehicle goes in reverse for the purpose of getting the vehicle out of the parking space is larger than the ratio in the case where the vehicle goes in reverse for the purpose of parking the vehicle into the parking space".

At least one portion of the feature in the above described embodiment and the modified example may be eliminated or modified accordingly. At least one feature in the above described embodiment and the modified example may be combined with another one feature in the above described embodiment and the modified example.

This application is based upon and claims the benefit of priority of the prior Japanese Patent Application No. 2017-237036, filed on Dec. 11, 2017, the entire contents of which are incorporated herein by reference. In addition, the entire contents of the above described Patent Literatures 1 to 3 are incorporated herein by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention. An image display apparatus, which involve such changes, are also intended to be within the technical scope of the present invention.

REFERENCE SIGNS LIST 1, 2 vehicle
11B rear camera
11BL, 11BL_U, 11BL_L, 11BL_S rear left camera
11BR, 11BR_U, 11BR_L, 11BR_S rear right camera
12 shift position sensor
13 ECU
131 image collecting unit
132 image synthesizing unit
14 display
111B, 112B rear image
111BL, 112BL, 112BL_L, 112BL_U, 112BL_S rear left image
111BR, 112BR, 112BR_L, 112BR_S rear right image
111C synthesized image
IRB, IRBL, IRBR imaging range
IRB_U, IRBL_U, IRBR_U upper imaging range
IRB_L, IRBL_L, IRBR_L upper imaging range
IRBL_S, IRBR_S side imaging range

The invention claimed is:

1. An image display apparatus comprising:
a controller that is programmed to synthesize a rear image and a rear side image to generate a synthesized image, wherein the rear image is captured by a rear imager that is configured to image a rear area located at the rear of a vehicle and the rear side image is captured by a rear side imager that is configured to image a rear side area located at the rear and the side of the vehicle; and
a display that is configured to display the synthesized image,
the controller being programmed to generate the synthesized image so that the synthesized image includes a first scene when the vehicle goes in reverse, the first scene including an area below the vehicle, as viewed from the vehicle, and a second scene when the vehicle does not go in reverse, wherein
the controller is programmed to generate the synthesized image such that a method of generating the synthesized image including the first scene, when the vehicle goes in reverse, is different when the vehicle goes in reverse from being in a state where the vehicle is traveling in a forward direction compared to when the vehicle goes in reverse from being in a parked state.

2. The image display apparatus according to claim 1, wherein
the controller is programmed to generate the synthesized image so that the synthesized image includes at least one portion of the vehicle when the vehicle goes in reverse.

3. The image display apparatus according to claim 2, wherein the controller is programmed to generate the synthesized image so that the synthesized image includes at least one portion of the vehicle and a road when the vehicle goes in reverse.

4. The image display apparatus according to claim 2, wherein
the at least one portion of the vehicle includes at least one portion of a rear wheel and/or at least one portion of a body of the vehicle.

5. The image display apparatus according to claim 2, wherein
the controller is programmed to generate the synthesized image in which a scene in the rear image and a scene in the rear side image are seamlessly connected at a border between the rear image and the rear side image when the vehicle does not go in reverse,
the controller is programmed to generate the synthesized image after allowing the scene in the rear image and the scene in the rear side image not to be seamlessly connected at the border between the rear image and the rear side image when the vehicle goes in reverse.

6. An image display apparatus comprising:
a controller is programmed to synthesize a rear image and a rear side image to generate a synthesized image, wherein the rear image is captured by a rear imager that is configured to image a rear area located at the rear of a vehicle and the rear side image is captured by a rear side imager that is configured to image a rear side area located at the rear and the side of the vehicle; and
a display that is configured to display the synthesized image,
the controller being programmed to generate the synthesized image so that a method of generating the synthesized image when the vehicle goes in reverse is is different when the vehicle goes in reverse from being in a state where the vehicle is traveling in a forward direction compared to when the vehicle goes in reverse from being in a parked state.

7. The image display apparatus according to claim 6 wherein
the controller is programmed to generate the synthesized image so that the synthesized image generated when the vehicle goes in reverse from being in the parked state includes a scene that is at the left and/or at the right of another scene that is included in the synthesized image generated when the vehicle goes in reverse from being in the state where the vehicle is traveling in the forward direction.

8. The image display apparatus according to claim 6, wherein
the controller is programmed to generate the synthesized image so that a ratio of an area in which the rear side image is displayed in the synthesized image with respect to the synthesized image in the case where the vehicle goes in reverse from being in the parked state is larger than the ratio in the case where the vehicle goes in reverse from being in the state where the vehicle is traveling in the forward direction.

* * * * *